1

(12) United States Patent
Ogata

(10) Patent No.: US 8,521,692 B1
(45) Date of Patent: Aug. 27, 2013

(54) STORAGE SYSTEM AND METHOD FOR CONTROLLING STORAGE SYSTEM

(75) Inventor: Mikito Ogata, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/513,457

(22) PCT Filed: Feb. 28, 2012

(86) PCT No.: PCT/JP2012/054996
§ 371 (c)(1),
(2), (4) Date: Jun. 1, 2012

(51) Int. Cl.
*G06F 17/00* (2006.01)

(52) U.S. Cl.
USPC ........... 707/640; 707/614; 707/618; 707/624; 707/647; 707/673

(58) Field of Classification Search
USPC .................. 707/614, 618, 624, 647, 640, 673
See application file for complete search history.

(56) References Cited

U.S. PATENT DOCUMENTS

| | | | |
|---|---|---|---|
| 2005/0060356 A1 | 3/2005 | Saika | |
| 2006/0259724 A1 | 11/2006 | Saika | |
| 2008/0005201 A1 | 1/2008 | Ting et al. | |
| 2008/0243769 A1 | 10/2008 | Arbour et al. | |
| 2011/0060887 A1* | 3/2011 | Thatcher et al. | 711/171 |
| 2011/0060927 A1* | 3/2011 | Fillingim et al. | 713/320 |
| 2011/0296133 A1* | 12/2011 | Flynn et al. | 711/171 |
| 2012/0011340 A1* | 1/2012 | Flynn et al. | 711/171 |

FOREIGN PATENT DOCUMENTS

| | | |
|---|---|---|
| JP | 2005-92282 A | 4/2005 |
| JP | 2005092282 A | 4/2005 |
| JP | 2008257716 A | 10/2008 |
| JP | 2009543199 A | 12/2009 |

\* cited by examiner

*Primary Examiner* — Sana Al Hashemi
(74) *Attorney, Agent, or Firm* — Volpe And Koenig, P.C.

(57) ABSTRACT

Provided is a storage system which provides a data storage area to an external apparatus. The storage system includes at least a first information apparatus including a first logical storage area constituting the data storage area, and a first data processing part for performing a processing for reducing a storage capacity of the first logical storage area used by backup target data, and a second information apparatus including a second logical storage area constituting the data storage area, and a second data processing part for performing a processing for reducing a storage capacity of the second logical storage area used by backup target data. The second information apparatus is communicatively coupled with the first information apparatus.

13 Claims, 28 Drawing Sheets

DE-DUPLICATION FUNCTION/STORAGE DESTINATION MANAGEMENT INFORMATION TABLE 2610

| FUNCTION ID | DE-DUPLICATION FUNCTION | STORAGE DESTINATION ID |
|---|---|---|
| 00 | BACKUP SERVER | A |
| 01 | STORAGE APPARATUS 2 | B |
| 02 | STORAGE APPARATUS 3 | C |
| ... | ... | ... |
| ... | ... | ... |
| k | STORAGE APPARATUS n | X |

FIG. 9

CONSTRAINT TABLE 2620

| INDEX ID | CONSTRAINT | DESIGNATED VALUE (TIME) |
|---|---|---|
| 0 | BACKUP TIME | 8 |
| 1 | CLEANING TIME | 6 |
| 2 | RESTORE TIME | 6 |
| 3 | NETWORK TIME | 4.5 |

FIG. 10

INDEX TABLE (BACKUP TIME) 2630A

| DATA ATTRIBUTE ID | DATA ATTRIBUTE NAME | DE-DUPLICATION FUNCTION ID | | |
|---|---|---|---|---|
| | | 00 | 01 | 02 |
| 00 | pdf | 1.0 | 1.3 | 1.0 |
| 01 | ppt | 1.5 | 2.0 | 1.0 |
| 02 | doc | 3.0 | 2.0 | 1.0 |
| 03 | xls | 1.5 | 1.0 | 2.0 |
| 04 | OTHERS | 1.5 | 2.0 | 1.0 |

FIG. 11A

INDEX TABLE (CLEANING TIME) 2630B

| DATA ATTRIBUTE ID | DATA ATTRIBUTE NAME | DE-DUPLICATION FUNCTION ID | | |
|---|---|---|---|---|
| | | 00 | 01 | 02 |
| 00 | pdf | 0 | 0 | 1.0 |
| 01 | ppt | 0 | 0 | 1.5 |
| 02 | doc | 0 | 0 | 1.0 |
| 03 | xls | 0 | 0 | 1.0 |
| 04 | OTHERS | 0 | 0 | 1.5 |

FIG. 11B

INDEX TABLE (RESTORE TIME) 2630C

| DATA ATTRIBUTE ID | DATA ATTRIBUTE NAME | DE-DUPLICATION FUNCTION ID | | |
|---|---|---|---|---|
| | | 00 | 01 | 02 |
| 00 | pdf | 0.8 | 1.1 | 0.8 |
| 01 | ppt | 1.3 | 1.8 | 0.8 |
| 02 | doc | 2.8 | 1.8 | 0.8 |
| 03 | xls | 1.3 | 1.8 | 0.8 |
| 04 | OTHERS | 1.3 | 1.8 | 0.8 |

FIG. 11C

INDEX TABLE (NETWORK TIME) 2630D

| DATA ATTRIBUTE ID | DATA ATTRIBUTE NAME | STORAGE DESTINATION | | |
|---|---|---|---|---|
| | | A | B | C |
| 00 | pdf | 0.2 | 0.4 | 0.3 |
| 01 | ppt | 0.4 | 0.2 | 0.3 |
| 02 | doc | 0.3 | 0.5 | 0.4 |
| 03 | xls | 0.4 | 0.2 | 0.3 |
| 04 | OTHERS | 0.3 | 0.4 | 0.2 |

FIG. 11D

INDEX TABLE (DE-DUPLICATION RATE) 2630E

| DATA ATTRIBUTE ID | DATA ATTRIBUTE NAME | DE-DUPLICATION FUNCTION ID | | |
|---|---|---|---|---|
| | | 00 | 01 | 02 |
| 00 | pdf | 0.2 | 0.4 | 0.3 |
| 01 | ppt | 0.4 | 0.2 | 0.3 |
| 02 | doc | 0.3 | 0.5 | 0.4 |
| 03 | xls | 0.4 | 0.2 | 0.3 |
| 04 | OTHERS | 0.3 | 0.4 | 0.2 |

FIG. 11E

DATA ATTRIBUTE BASED REGISTRATION INFORMATION TABLE 2640

| DATA ATTRIBUTE ID | DATA ATTRIBUTE NAME | TOTAL DATA SIZE |
|---|---|---|
| 00 | pdf | 0.2MB |
| 01 | ppt | 0.3MB |
| 02 | doc | 1.0MB |
| 03 | xls | 2.0MB.. |
| 04 | OTHERS | 10.0MB... |

FIG. 12

BACKUP/RESTORE HISTORY INFORMATION TABLE 2650

| ACTION TYPE | ACTION ID | START TIME | END TIME | BACKUP SOURCE (RESTORE DESTINATION) INFORMATION | |
|---|---|---|---|---|---|
| | | | | DEVICE NO. | LOGICAL DEVICE NO. |
| BACKUP | 001 | 2011/11/11 18:00:00 | 2011/11/12 00:02:13 | 0001 | 0001 |
| BACKUP | 002 | 2011/11/12 01:00:00 | 2011/11/12 01:04:05 | 0002 | 0001 |
| RESTORE | 001 | 2011/11/11 08:00:00 | 16:00:00 | 0001 | 0001 |
| ... | ... | ... | ... | ... | ... |

2656

| BACKUP DESTINATION (RESTORE SOURCE) INFORMATION | | | | | | |
|---|---|---|---|---|---|---|
| ADDITIONAL INFORMATION STORAGE DESTINATION | | | ... | ADDITIONAL INFORMATION STORAGE DESTINATION | | |
| DEVICE NO. | LOGICAL DEVICE NO. | ADDITIONAL INFORMATION STORAGE LOCATION INFORMATION | ... | DEVICE NO. | LOGICAL DEVICE NO. | ADDITIONAL INFORMATION STORAGE LOCATION INFORMATION |
| 0003 | 0001 | 00000010 | ... | 0003 | 0002 | 00009AC0 |
| 004 | 001 | 00001250 | ... | 0004 | 0002 | 00009B20 |
| – | – | – | ... | – | – | – |
| ... | ... | ... | ... | ... | ... | ... |

FIG. 13

| INDEX | | TRY1 | TRY2 | TRY3 | TRY4 | TRY5 | TRY6 | TRY7 | TRY8 |
|---|---|---|---|---|---|---|---|---|---|
| BACKUP LIMIT TIME Win0(0) (HOUR) | | 8.00 | 8.00 | 8.00 | 7.52 | 7.29 | 7.29 | 7.23 | 7.20 |
| Win0(1) | | 8.95 | 8.95 | 7.05 | 7.05 | 7.05 | 7.17 | 7.17 | 7.17 |
| Win0(2) | | – | 7.05 | 7.52 | 7.29 | 7.17 | 7.23 | 7.20 | 7.19 |
| SEARCH INTERVAL (BISECTION METHOD) | (h) | – | -0.95h | 0.47h | -0.23h | -0.12h | 0.06h | -0.03 | -0.01 |
| | (min) | – | -57min | 29min | -14min | -7min | 3min | 1min | 0.8min |
| MEAN BACKUP TIME (HOUR) | | 7.98 | 7.03 | 7.51 | 7.27 | 7.13 | 7.20 | 7.15 | 7.14 |
| REMOVED DATA AMOUNT (TB) | | 9.51 | 9.09 | 9.33 | 9.20 | 9.14 | 9.18 | 9.16 | 9.17 |
| f(x): MEAN BACKUP TIME $\mu + 3\sigma$ (HOUR) | | 8.95 | 7.78 | 8.44 | 8.17 | 8.00 | 8.14 | 8.09 | 8.08 |
| CLEANING TIME (HOUR) | | 5.98 | 5.96 | 5.88 | 5.98 | 5.89 | 5.97 | 5.90 | 5.80 |
| RESTORE TIME (HOUR) | | 7.92 | 7.82 | 7.91 | 7.41 | 7.80 | 7.50 | 7.45 | 7.46 |
| NETWORK LOAD (HOUR) | | 4.37 | 4.37 | 4.44 | 4.38 | 4.32 | 4.39 | 4.39 | 4.40 |

Win0(2) = (Win0(1) + Win0(0)) ÷ 2

FIG. 16B

INTEGER PROGRAMMING RESULT TABLE (BACKUP TIME) 2670A

| DATA ATTRIBUTE ID | DATA ATTRIBUTE NAME | DE-DUPLICATION FUNCTION ID | | |
|---|---|---|---|---|
| | | 00 | 01 | 02 |
| 00 | pdf | – | 1.92 | – |
| 01 | ppt | – | 1.91 | – |
| 02 | doc | 5.78 | – | – |
| 03 | xls | – | – | 4.91 |
| 04 | OTHERS | – | 2.01 | – |

FIG. 17A

INTEGER PROGRAMMING RESULT TABLE (CLEANING TIME) 2670B

| DATA ATTRIBUTE ID | DATA ATTRIBUTE NAME | DE-DUPLICATION FUNCTION ID | | |
|---|---|---|---|---|
| | | 00 | 01 | 02 |
| 00 | pdf | – | – | – |
| 01 | ppt | – | – | – |
| 02 | doc | – | – | – |
| 03 | xls | – | – | 1.00 |
| 04 | OTHERS | – | – | – |

FIG. 17B

INTEGER PROGRAMMING RESULT TABLE (RESTORE TIME) 2670C

| DATA ATTRIBUTE ID | DATA ATTRIBUTE NAME | DE-DUPLICATION FUNCTION ID | | |
|---|---|---|---|---|
| | | 00 | 01 | 02 |
| 00 | pdf | - | 1.20 | - |
| 01 | ppt | - | 2.80 | - |
| 02 | doc | 4.10 | - | - |
| 03 | xls | - | - | 3.80 |
| 04 | OTHERS | - | 2.80 | - |

INTEGER PROGRAMMING RESULT TABLE (NETWORK TIME) 2670D

| DATA ATTRIBUTE ID | DATA ATTRIBUTE NAME | STORAGE DESTINATION | | |
|---|---|---|---|---|
| | | A | B | C |
| 00 | pdf | - | 1.20 | - |
| 01 | ppt | - | 1.20 | - |
| 02 | doc | 0.60 | - | - |
| 03 | xls | - | - | 1.20 |
| 04 | OTHERS | - | 1.20 | - |

DE-DUPLICATION FUNCTION ALLOCATION RESULT TABLE 2690

| DATA ATTRIBUTE ID | DATA ATTRIBUTE NAME | DE-DUPLICATION FUNCTION ID |
|---|---|---|
| 00 | pdf | 01 |
| 01 | ppt | 01 |
| 02 | doc | 00 |
| 03 | xls | 02 |
| 04 | OTHERS | 01 |

FIG. 19

STORAGE SYSTEM AND METHOD FOR CONTROLLING STORAGE SYSTEM

CROSS-REFERENCE TO RELATED APPLICATIONS

The present invention relates to PCT International Patent Application No. PCT/JP2011/007113 filed Dec. 20, 2011 designating the United States and its United States National Stage patent application Ser. No. 13/383,554, both of which are incorporated herein by reference.

TECHNICAL FIELD

The present invention relates to a storage system and a method for controlling a storage system.

BACKGROUND ART

A storage system generally includes a computer such as a server computer executing data processing, hereinafter referred to as a "server", and a storage apparatus communicatively coupled to the server, and is configured to store data processed by the server in the storage apparatus. Data processed by the server can be roughly classified into structured data stored into a database, for example, and other non-structured data. The non-structured data includes data in various formats such as document, image, and sound.

With recent remarkable increase in non-structured data to be stored in a storage system, there have been increasing demands for fast and efficient data backup processing of non-structured data. In addition, in order to minimize storage resources consumed by backup data, a de-duplication function for preventing duplicate storage of same data and a data compression function for reducing the amount of stored data are used in data backup processing.

In the meantime, it is not rare that one storage system includes servers and storage apparatuses supplied by different vendors from the view point of effective utilization of hardware assets and software assets. In this case, different apparatuses within one storage system operate different de-duplication functions and/or different data compression functions. Thus, the execution time required for data backup processing of a unit data size and a data amount reduced by de-duplication are known to vary in some cases depending on the de-duplication functions and data compression functions (hereinafter, collectively referred to as "de-duplication function"), more specifically, depending on which one of the different apparatuses actually executes de-duplication processing and data compression processing (hereinafter, collectively referred to as "de-duplication processing").

For data backup processing in such a storage system including different de-duplication functions, the execution is usually planned at a time period avoiding normal business hours in day time in order not to affect, for example, routine works utilizing the storage system. For example, assuming that normal business hours are from 8 AM to 6 PM, a time period available for data backup processing is a time window of 8 hours from 8 PM following the business hours until 4 AM of the next day, and the execution of data backup processing is set to complete within this time window. Usually, a correspondence between a server or storage apparatus serving as a backup source and a server or storage apparatus serving as a backup destination of the data sent from the backup source is determined in a fixed manner. In this case, unless a system administrator or the like changes the correspondence, data to be backed up from a particular backup source to a backup destination is processed by a particular de-duplication function implemented in any one of apparatuses on the backup processing path irrespective of a data type. If data amount processed by a particular de-duplication function increases so much, the de-duplication function cannot process data within a data backup processing time window. This is undesirable since routine works are affected by the event.

In view of such problems as described above, for example, Patent Literature 1 discloses a backup system including a backup source computer which stores backup target data, multiple backup destination computers, each of which is coupled to the backup source computer via a network, a backup mode selection means for selecting one backup mode from multiple backup modes prepared in advance, according to a data property of backup target data, and a backup execution means for causing the backup source computer to transfer the backup target data to a backup destination computer selected from the backup destination computers on the basis of the selected backup mode, and causing the backup destination computer to store the data.

CITATION LIST

Patent Literature

[PTL 1]
Japanese Patent Application Publication No. 2005-92282

SUMMARY OF INVENTION

Technical Problem

However, when a time constraint on the backup processing cannot be satisfied due to an increase in data to be processed, the backup system disclosed in Patent Literature 1 requires a user of the storage system to set again data allocation by determining which of the de-duplication functions to use according to the type of data to be processed. Hence, the backup system disclosed in Patent Literature 1 has a problem of imposing an excessive burden on the user.

The present invention is provided in order to solve the above and other problems. An object of the present invention is to provide a storage system and a method for controlling the storage system, which are capable of automatically allocating data to different de-duplication functions according to types of backup target data in such a manner as to satisfy a time limit of backup processing and maximize a data amount reduced by de-duplication.

Solution to Problem

For achieving the above and other objects, one aspect of the present invention is a storage system for providing a data storage area to an external apparatus. The storage system comprises at least a first information apparatus including a first logical storage area constituting the data storage area, and a first data processing part for performing a processing for reducing a storage capacity of the first logical storage area used by backup target data, and a second information apparatus including a second logical storage area constituting the data storage area, and a second data processing part for performing a processing for reducing a storage capacity of the second logical storage area used by backup target data, the second information apparatus communicatively coupled with the first information apparatus. The first information apparatus includes backup speed data, restore speed data, cleaning speed data, and network speed data indicating a time required to process a unit data size of each data attribute indicating a type of the backup target data attribute of the backup target data by the first data processing part and the second data processing part for each data attribute, a backup target data allocation control part for calculating a total backup time, a total restore time, a total cleaning time, and a total network time from the backup speed data, the restore speed data, the cleaning speed data, and the network speed data and data size of each data attribute of the backup target data, the total backup time, the total restore time, the total cleaning time, and the total network time indicating a time required to process the backup target data of each data attribute by the first data processing part and the second data processing part, and obtaining a combination of the data attribute with the first data processing part or the second data processing part, the combination having the total backup time, the total restore time, the total cleaning time, and the total network time each equal to or shorter than a predetermined limit time, a maximum data removal amount thereby, and an upper limit value of a predetermined variation range set for the total backup time equal to or shorter than the backup limit time, and a backup processing part for backing up the backup target data in accordance with the combination of the data attribute with the first data processing part or the second data processing part that is to process the backup target data belonging to the data attribute, the combination determined by the backup target data allocation control part.

Another aspect of the present invention is a method for controlling a storage system for providing a data storage area to an external apparatus. The storage system at least includes a first information apparatus including a first logical storage area constituting the data storage area, and a first data processing part for performing a processing for reducing a storage capacity of the first logical storage area used by backup target data, and a second information apparatus including a second logical storage area constituting the data storage area, and a second data processing part for performing a processing for reducing a storage capacity of the second logical storage area used by backup target data, the second information apparatus communicatively coupled with the first information apparatus. In this method, the first information apparatus holds backup speed data, restore speed data, cleaning speed data, and network speed data indicating a time required to process a unit data size of each data attribute indicating a type of the backup target data attribute of the backup target data by the first data processing part and the second data processing part for each data attribute, calculates a total backup time, a total restore time, a total cleaning time, and a total network time from the backup speed data, the restore speed data, the cleaning speed data, and the network speed data and data size of each data attribute of the backup target data, the total backup time, the total restore time, the total cleaning time, and the total network time indicating a time required to process the backup target data of each data attribute by the first data processing part and the second data processing part, and obtains a combination of the data attribute with the first data processing part or the second data processing part, the combination having the total backup time, the total restore time, the total cleaning time, and the total network time each equal to or shorter than a predetermined limit time, a maximum data removal amount thereby, and an upper limit value of a predetermined variation range set for the total backup time equal to or shorter than the backup limit time, and backs up the backup target data in accordance with the determined combination of the data attribute with the first data processing part or the second data processing part that is to process the backup target data belonging to the data attribute.

Advantageous Effects of Invention

The present invention provides a storage system and a method for controlling the storage system, which are capable of automatically allocating data to different de-duplication functions according to types of backup target data in such a manner as to satisfy a time limit of backup processing and maximize a data amount reduced by de-duplication.

BRIEF DESCRIPTION OF DRAWINGS

FIG. 9 is a diagram showing a configuration example of a de-duplication function/storage destination management information table 2610.

FIG. 10 is a diagram showing a configuration example of a constraint table 2620.

FIG. 11A is a diagram showing a configuration example of an index table for backup time 2630A.

FIG. 11B is a diagram showing a configuration example of an index table for post-processing time 2630B.

FIG. 11C is a diagram showing a configuration example of an index table for restore time 2630C.

FIG. 11D is a diagram showing a configuration example of an index table for network time 2630D.

FIG. 11E is a diagram showing a configuration example of an index table for de-duplication rate 2630E.

FIG. 12 is a diagram showing a configuration example of a data attribute based registration information table 2640.

FIG. 13 is a diagram showing a configuration example of a backup/restore history information table 2650.

FIG. 16B is a table showing calculation example of the backup time by the integer programming of FIG. 16A.

FIG. 17A is a diagram showing a configuration example of an integer programming result table for backup time 2670A.

FIG. 17B is a diagram showing a configuration example of an integer programming result table for post-processing time 2670B.

FIG. 17C is a diagram showing a configuration example of an integer programming result table for restore time 2670C.

FIG. 17D is a diagram showing a configuration example of an integer programming result table for network time 2670D.

FIG. 19 is a diagram showing a configuration example of a de-duplication function allocation result table 2690.

DESCRIPTION OF EMBODIMENTS

Figure 1:
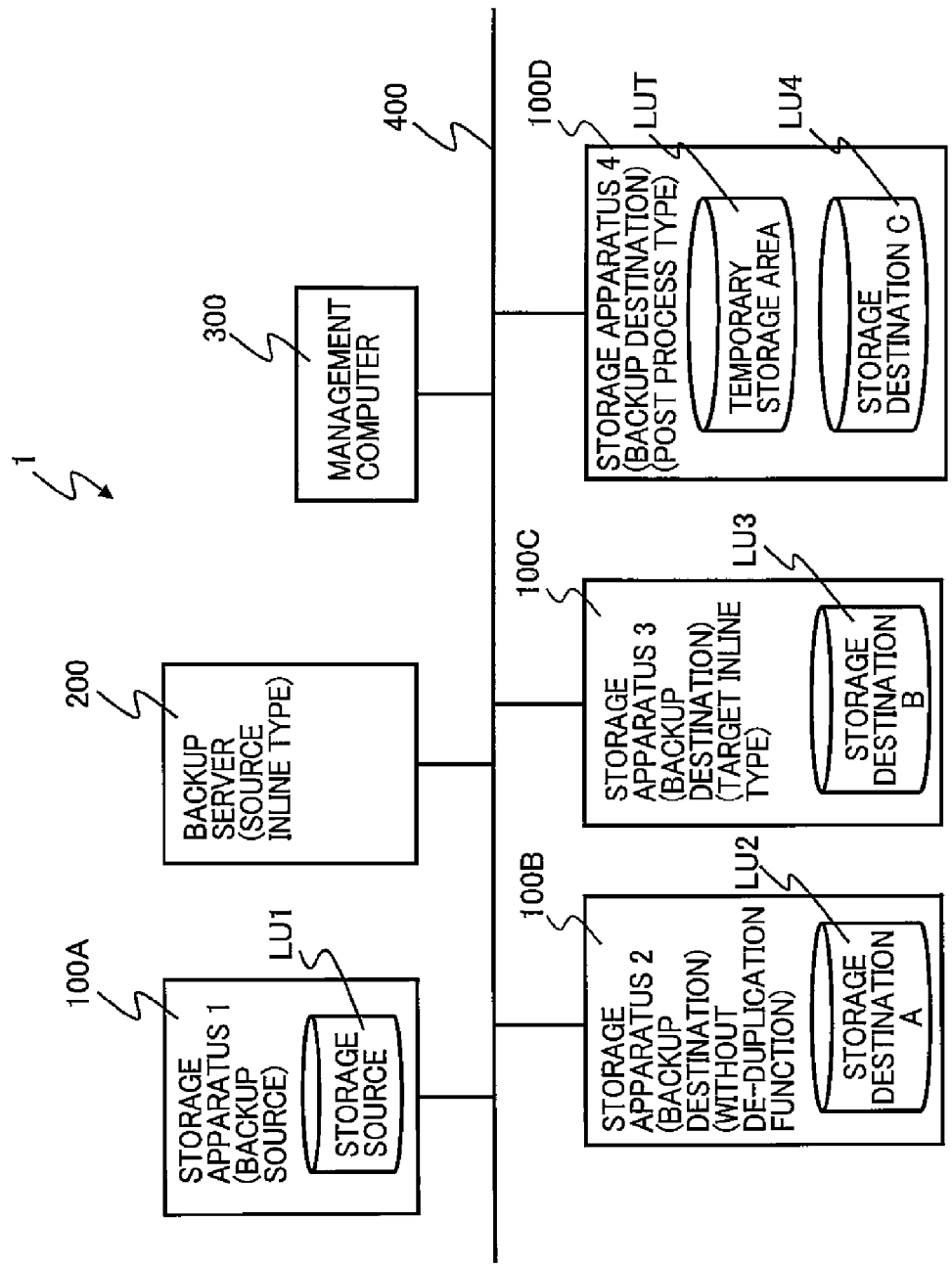
FIG. 1 is a diagram schematically showing a configuration example of a storage system 1 according to one embodiment of the present invention.

Hereinafter, modes for embodying the present invention are described with reference to the accompanying drawings. Throughout all the drawings, description of same configurations is omitted by denoting with same reference numerals.
Configuration of Storage System 1

First, a configuration of a storage system 1 according to one embodiment of the present invention is described. FIG. 1 shows a configuration example of a storage system 1 according to one embodiment of the present invention.

The storage system 1 includes storage apparatuses 100A to 100D, a backup server apparatus (hereinafter referred to as a "server") 200, a management computer 300, and a communication network 400. The storage apparatuses 100A to 100D, the server 200 and the management computer 300 are coupled to each other via a communication network 400 in a manner enabling mutual communication with each other.

The storage apparatuses 100A to 100D provide the server 200 in the storage system 1 with a storage area in which data processed by the server 200 is stored. The storage apparatuses 100A to 100D have a configuration of NAS (Network Attached Storage) configured to perform data input/output on a file basis. The configuration of the storage apparatuses 100A and 100B is substantially the same. Hereinafter, those apparatuses are referred to as a storage apparatus 100 unless specifically distinguished among the storage apparatuses 100A to 100D. The storage apparatus 100A provides a storage area LU1 directly to the server 200. The storage area LU1 is a logical storage device created by organizing a plurality of storage drives by a RAID (Redundant Array of Inexpensive (or Independent) Disks) method. The storage area LU1 may be used by further dividing into a plurality of logical volumes. Data stored in the storage area LU1 is backed up to other storage apparatuses 100B to 100D of the storage system 1 by the server 200 described later. Thus, LU1 is positioned as a data storage source of the server 200.

The storage apparatuses 100B to 100D respectively provide storage areas LU2 to LU4 as backup destinations of data stored in the storage apparatus 100A by the server 200 as described above. The storage area LU2 provided in the storage apparatus 100B is used as a storage destination A of data subjected to the de-duplication processing in the server 200 by a de-duplication function implemented in the server 200. The storage apparatus 100B has no de-duplication function itself. A backup processing method in which the de-duplication processing is performed on the side of a server performing the backup processing is called a source inline type backup processing. In the source inline type backup processing, data subjected to the de-duplication processing is transferred from the server 200 to a storage destination, whereby a transfer time through the communication network 400 is reduced, and a time involved in storing into a storage destination at a backup destination is substantially eliminated.

The storage area LU3 provided in the storage apparatus 100C is used as a storage destination B of backup target data transferred from the server 200 and then subjected to de-duplication processing by a de-duplication function implemented in the storage apparatus 100C itself. In this case, a de-duplication function implemented in the server 200 is not used. Such a backup method in which the de-duplication processing is executed by the storage apparatus 100C serving as a data storage destination in the execution of backup processing is called a target inline type backup processing. In the target inline type backup processing, data yet subjected to the de-duplication processing is transferred from the server 200 to a storage destination and stored in the storage area LU3 after subjected to the de-duplication processing in the storage apparatus 100C. Thus, the transfer time through the communication network 400 is longer than the source inline type backup processing. However, the de-duplication process is completed when the backup process is completed as in the process of source inline type.

The storage area LU4 provided in the storage apparatus 100D is used, similarly with the storage apparatus 100C, as a storage destination C of backup target data transferred from the server 200 and then subjected to the de-duplication processing by a de-duplication function implemented in the storage apparatus 100D itself. The storage apparatus 100D is different from the storage apparatus 100C in that the storage apparatus 100D includes a temporary storage area LUT. Backup target data received from the server 200 is once stored in the temporary storage area LUT, and at that time, a notification of backup completion is returned to the server 200. At an appropriate timing such as when the process load of the apparatus is alleviated, the storage apparatus 100D performs the de-duplication processing of data stored in the temporary storage area LUT and then stores data in the storage area LU4 (storage destination C). Such a backup method of temporarily storing data once in the storage apparatus C serving as a data storage destination after the backup processing and thereafter performing the de-duplication processing is called a post process type backup processing. The time involved for de-duplicating the data stored in the temporary storage area LUT and storing the resultant data in the storage area LU4 (storage destination C) is called a post-processing time. Transfer time through the communication network 400 is the same as the target inline type. But, since the backup processing completes when data is stored from the server 200 into the temporary storage area LUT, a post-processing time in the storage apparatus 100D serving as a storage destination can be substantially neglected similarly with the source inline type. Thus, the storage system 1 according to the present embodiment ensures that a time needed for the backup processing of data stored in the storage apparatus 100A by the server 200 is within a predetermined limit time by appropriately allocating a backup method out of the above three backup methods including the source inline type, the target inline type and the post process type according to the attribute of backup target data.

Next, the server 200 is described. The server 200 is a backup server which executes the backup processing in the storage system 1, and also has a function of a file server using the storage area LU1 in the storage apparatus 100A as a direct data storage location. As a file server, the server 200 provides read target data on the file basis in response to a data read request, for example, from a client apparatus (hereinafter, referred to as "client"), which is an external apparatus (not shown). The server 200 may be used exclusively for backup processing of the storage system 1, and one or more other servers 200 may be coupled with the client via the communication network 400. As described above, the server 200 shown in FIG. 1 has a de-duplication function for performing the source inline type backup processing.

The management computer 300 is provided with functions of giving operation inputs for various settings of the storage apparatuses 100A to 100D, giving operation inputs for the backup/restore processing, and receiving and displaying outputs of operation results from the storage apparatuses 100A to 100D, and the like.

The communication network 400 is a communication line enabling mutual communication to each other among the server 200, the storage apparatuses 100A to 100D, and the management computer 300. For example, the communication network 400 may be configured as a LAN (Local Area Network) in which communication is performed by the Internet protocol. The configuration of the communication network 400 is not limited to the LAN, but a SAN (Storage Area Network) using the fiber channel (FC) channel may be adopted. Minimum system configuration of the storage system 1 illustrated in FIG. 1 includes a configuration comprising two storage apparatuses 100B (of the source inline type), a configuration comprising two storage apparatuses 100C (of the target inline type), a configuration comprising two storage apparatuses 100D (of the post process type), a configuration comprising each one of the storage apparatuses 100B and 100C (a mixture of the source inline type and the target inline type), a configuration comprising each one of storage apparatuses 100B and 100D (a mixture of the source inline type and the post process type), and a configuration comprising each one of storage apparatuses 100C and 100D (a mixture of the target inline type and the post process type).

Figure 2:
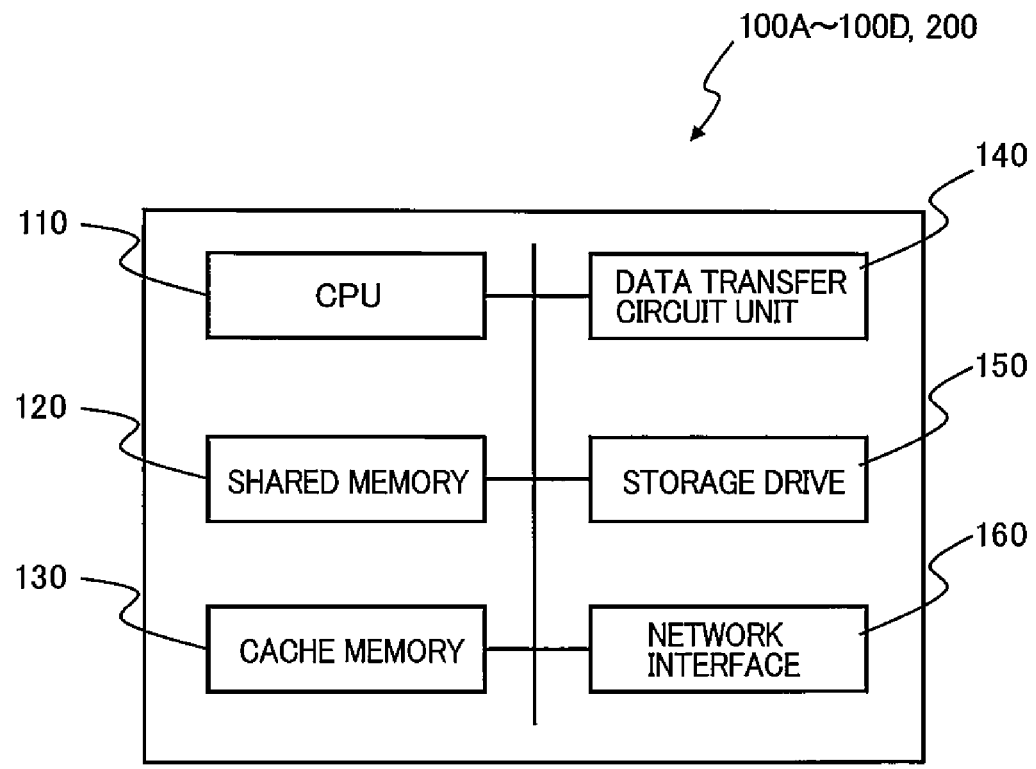
FIG. 2 is a diagram showing a hardware configuration example of storage apparatuses 100A to 100D and a backup server apparatus 200 included in the storage system 1.

Hardware configuration of server 200 and storage apparatus 100 Next, a hardware configuration of the server 200 and the storage apparatus 100 included in the storage system 1 shown in FIG. 1 is described. FIG. 2 shows a hardware configuration of the server 200 and the storage apparatus 100. In the storage system 1 according to the present embodiment, the server 200 and the storage apparatus 100 have a substantially the same hardware configuration. Here, a hardware configuration of the storage apparatus 100 is described.

The storage apparatus 100 according to the present embodiment includes a processor 110, a shared memory 120, a cache memory 130, a data transfer circuit unit 140, a storage drive 150, and a network interface 160. The processor 110 is a unit which executes various programs for achieving functions such as the backup processing described later and the like, and is configured, for example, as a CPU (Central Processing Unit) or an MPU (Microprocessor Unit). Herein, the processor 110 is referred to as "CPU".

The shared memory 120 is a memory which stores various programs for achieving functions such as the backup processing described later and the like, parameters used during the execution of programs, data of various tables, and the like. The shared memory 120 includes memory elements such as a ROM (Read Only Memory), a RAM (Random Access Memory), a flash memory, and the like. The cache memory 130 is a storage area in which write data to the storage drive 150 described later and read data from the storage drive 150 is temporarily stored. The cache memory 130 includes, for example, a memory element such as a RAM, or the like.

The data transfer circuit unit 140 executes, under control of the CPU 110, data transfer between the storage drive 150 and the cache memory 130 and between the cache memory 130 and the network interface 160 described later. The storage drive 150 is a storage device for producing a storage area which the storage apparatus 100 provides to an external client, and can be configured by appropriate storage devices including a hard disk drive (HDD), a semiconductor storage drive (Solid State Drive, SSD), and the like.

The network interface 160 serves as an interface between the communication network 400 and an internal network in the server 100. When the communication network 400 is configured as a LAN like the present embodiment, a NIC (Network Interface Card) is used as the network interface 160.

Hardware Configuration of Management Computer 300

Figure 3:
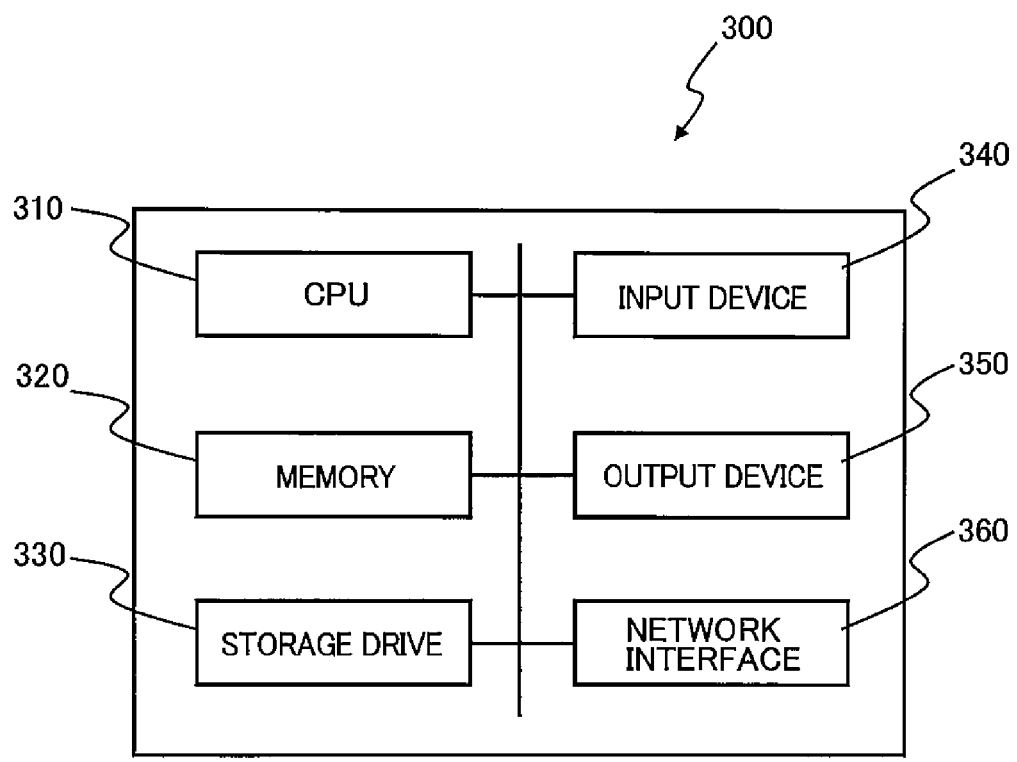
FIG. 3 is a diagram showing a hardware configuration example of a management computer 300 included in the storage system 1.

Next, a hardware configuration of the management computer 300 is described. FIG. 3 shows a hardware configuration example of the management computer 300 in the storage system 1 according to the present embodiment. As illustrated in FIG. 3, the management computer 300 includes a CPU 310, a memory 320, a storage drive 330, an input device 340, an output device 350, and a network interface 360.

The CPU 310 is the same as the CPU 110 of the server 100, and may be an alternative calculation device such as an MPU, or the like, as well as the CPU. The memory 320 is a memory to store various programs for achieving functions as the management computer 300, parameters used during the execution of programs and data of various tables, and the like. The memory 320 includes a ROM, a RAM, a flash memory, and the like. The storage drive 330 is an auxiliary storage apparatus including a storage device the same as the storage drive 150 of the server 100, and may be configured by an appropriate storage device including HDD, SSD, and the like.

The input device 340 is a data input device used in general-purpose computers, and may include an appropriate input device which is selected from, for example, a keyboard, a mouse, a touch screen, a pen tablet and the like. The output device 350 is a data output device used in general-purpose computers and may include an appropriate output device which is selected from a ROM, a RAM, a flash memory, or the like. The network interface 360 is an interface circuit such as, for example, an NIC or the like, similarly with the network interface 160.

Software Configuration of Server 200

Figure 4:
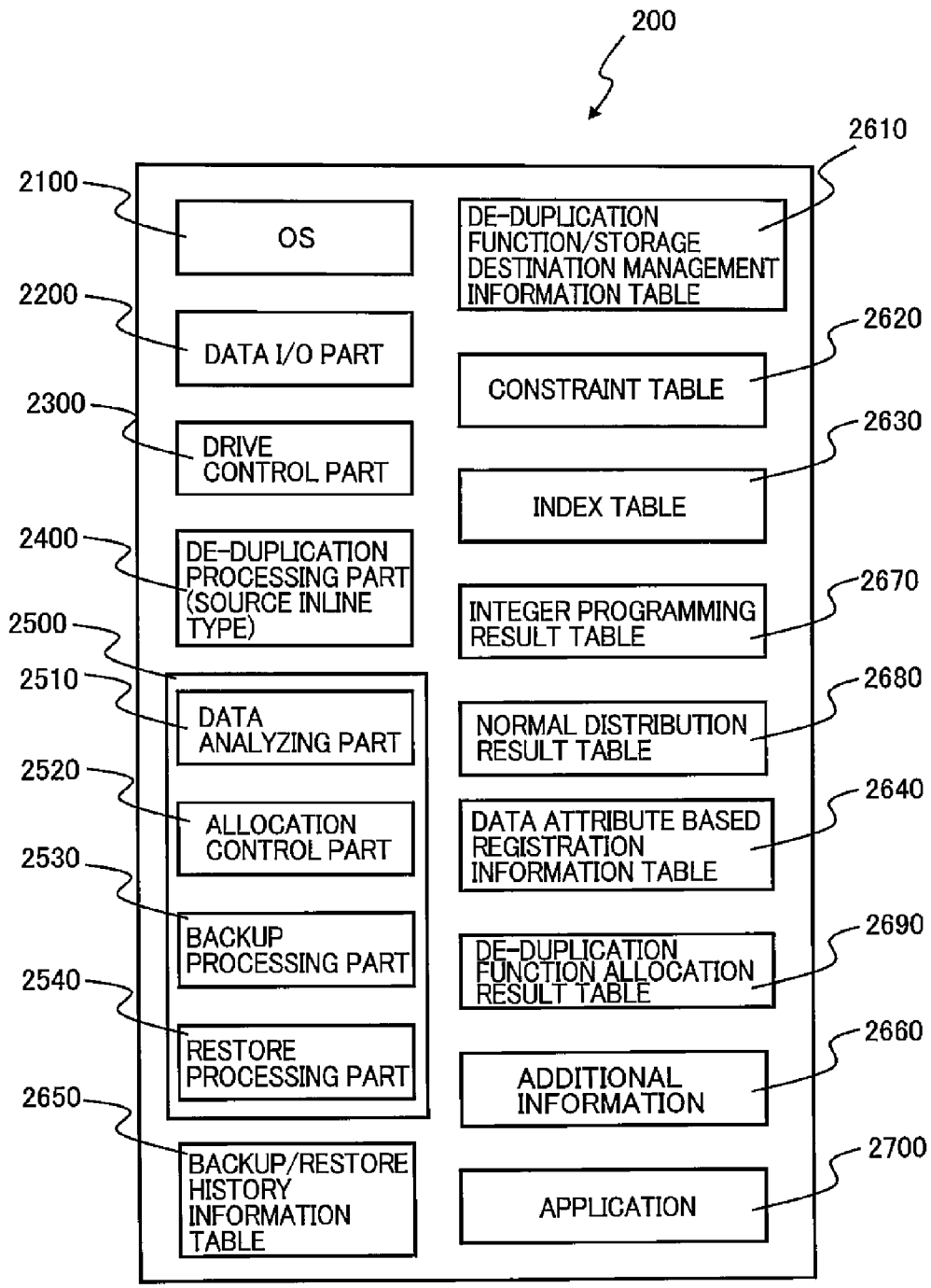
FIG. 4 is a diagram showing a software configuration example of the management computer 300 included in the storage system 1.

Next, a software configuration of the server 200 is described. FIG. 4 shows a software configuration example of the server 200.

The server 200 illustrated in FIG. 4 includes an operating system (OS) 2100, a data I/O part 2200, a drive control part 2300, a de-duplication processing part 2400, a data analyzing part 2510, an allocation control part 2520, a backup processing part 2530, a restore processing part 2540, a de-duplication function/storage destination management information table 2610, a constraint table 2620, an index table 2630, a data attribute based registration information table 2640, a backup/restore history information table 2650, additional information 2660, an integer programming result table 2670, a normal distribution result table 2680, a de-duplication function allocation result table 2690, and an application 2700. The table analyzing part 2510, the allocation control part 2520, the backup processing part 2530 and the restore processing part 2540 configures a de-duplication function allocation control part 2500 per data attribute which achieves main functions as the backup server 200 according to the present embodiment. Functions of the OS 2100, the data I/O part 2200, the drive control part 2300, the de-duplication processing part 2400, the data analyzing part 2510, the allocation control part 2520, the backup processing part 2530, the restore processing part 2540 and the application 2700 are achieved, for example, by executing program of respective functions read into the shared memory 120 by the CPU 110. Similarly, data used by the above programs are stored in the de-duplication function/storage destination management table 2610, the constraint table 2620, the index table 2630, the data attribute based registration information table 2640, the backup/restore history information table 2680, the additional information 2660, the integer programming result table 2670, the normal distribution result table 2680, and the de-duplication function allocation result table 2690 and the above tables are stored in the shared memory 120.

The OS 2100 is a basic software serving as a base for executing various programs executed in the server 200, and can be used by selecting out of various OS generally used as a computer OS. The server 200 according to the present embodiment manages data on the file basis. Thus, the OS 2100 includes a file system of an appropriate format. The data I/O part 2200 is a program which manages, under control of the OS 2100, data input/output (data I/O) to programs which are run in the server 200. The drive control part 2300 has a function of generating a logical storage device having a desired storage capacity by controlling the storage drive 150 of the server 200 in an appropriate RAID format.

The de-duplication processing part 2400 executes, when performing backup of data stored in the storage drive 150, a de-duplication processing which is a processing efficiently utilizing storage resources by preventing the waste of storage areas due to duplicate storage of same data in different storage areas. There are various de-duplication methods, but any method can be adopted in an appropriate manner. For example, the de-duplication may be either on a fixed length block basis or a variable length block basis. The de-duplication method includes various vendor-specific methods provided by storage vendors or the like. In the present embodiment, a data compression function of reducing the size of data to be backed up is implemented in conjunction with the de-duplication processing function. However, provision of the data compression function in the de-duplication processing part 2400 is not essential. A configuration having only a data compression function instead of the de-duplication processing may be adopted. Further, a data compression function in such a configuration may be of any method. As illustrated with reference to FIG. 1, the de-duplication processing part 2400 provided in the server 200 is used for a source inline type backup processing in which the de-duplication processing is performed on the server side when executing the backup processing.

The data analyzing part 2510 has a function of determining the data attribute and data size of each data attribute by analyzing data which becomes backup target data. In the present embodiment, data in the storage apparatus 100A in which backup target data is stored becomes a target processed by the data analyzing part 2510. In the present embodiment, an extension of the data file ("jpg" for image data of a JPEG (Joint Photographic Experts Group) type, "txt" for data of a text format, and the like) is adopted, but other alternative attribute may be selected.

The backup processing part 2530 and the restore processing part 2540 perform, for example, a backup processing of predetermined data stored in the storage apparatus 100A to other storage apparatuses 100B to 100D and a restoring processing of the backed up data from the storage apparatuses 100B to 100D of the backup destination to the storage apparatus 100A of the backup source. When performing the backup processing, de-duplication processing of backup target data is executed by using the de-duplication processing part 2400 provided in the backup source or in the server 200, the storage apparatus 100C or 100D as the backup destination, which is determined by a later-described de-duplication function allocation method according to the present embodiment. When performing the restore processing, data is restored into the storage apparatus 100A of the backup source by using the de-duplication processing part 2400 used for the backup processing.

The application 2700 has a function of performing various processings of data received from an external apparatus such as the client, the management computer 300, or the like. Various applications 2700 may be implemented on the storage apparatuses 100A to 100D, as well as the server 200.

Next, tables set in the server 200 are described with reference to configuration examples of respective tables. First, the de-duplication function/storage destination management information table 2610 is described. FIG. 9 shows a configuration example of the de-duplication function/storage destination management information table 2610. The de-duplication function/storage destination management information table 2610 records the location at which a de-duplication function which is a functional part having de-duplication functions included in the storage system 1 is disposed, and a storage destination of data processed by the de-duplication functions.

As illustrated in FIG. 9, the de-duplication function/storage destination management information table 2610 records a function ID 2611, a de-duplication function 2612, and a storage destination ID 2613. The function ID 2611 is an identifier assigned to enable identification of each of the de-duplication functions provided in the storage system 1. The de-duplication function 2612 indicates an apparatus in which a de-duplication function included in the storage system 1 is implemented. The storage destination ID 2613 is an identifier assigned to enable mutual identification of a backup destination of the storage apparatuses 100B to 100D in which backup target is stored, when a backup processing is executed by a de-duplication function identified by an associated function ID 2611. The example of FIG. 9 shows that a de-duplication function identified with the function ID 2611 of 00 is implemented in the backup server 200, and backup target data is stored in a storage destination identified with the storage destination ID 2613 of A. The de-duplication function/storage destination management information table 2610 is set in advance to the shared memory 120 or the storage drive 150 of the server 200 before starting the storage system 1.

Next, the constraint table 2620 is described. The constraint table 2620 is a table in which operational constraints of the storage system 1 are set for causing the server 200 to execute allocation of target data to a de-duplication function in the execution of backup processing. FIG. 10 shows a configuration example of the constraint table 2620. The constraint table 2620 stores an index ID 2621, a constraint 2622 and a designated value 2633 in association with each other. The index ID 2621 is an identifier for mutually identifying the constraint 2622, and the constraint 2622 indicates a time limit for the system operation. The designated value 2623 indicates an allowable upper limit value set for each constraint 2622 in units of hours. In the present embodiment, data allocation is executed by using the backup time, post-processing time, restore time and network time set as the constraint 2622. The constraint table 2620 is set by a system administrator or the like to the shared memory 120 or the storage drive 150 of the server 200 by using the management computer 300 before starting the system.

Next, the index tables 2630A to 2630E are described. FIGS. 11A to 11E show configuration examples of the index tables 2630A to 2630E. The index tables 2630A to 2630D record times required for the processing per unit data amount of backup target data attributes when a backup processing is performed using a de-duplication function provided in the storage system 1. The index table 2630E records a de-duplication ratio per unit data amount of backup target data attributes when a backup processing is performed using a de-duplication function provided in the storage system 1. In the index tables 2630A to 2630E, a backup time, a post-processing time, a restore time, a network time and a de-duplication rate are set. The index tables 2630A to 2630C for the backup time, the post-processing time and the restore time record a data attribute ID 2631, a data attribute name 2632 and de-duplication function IDs 2633A to 2633C in association with each other. The data attribute ID 2631 is an identifier to enable mutual identification of the data attribute of the backup target data. The data attribute name 2632 is a name of each of data attributes. In FIG. 11A to FIG. 11D, an extension used for each of data attributes is recorded respectively. The de-duplication function IDs 2633A to 2633C record an hour-based time required for ITB processing of data having an associated data attribute by using de-duplication functions 2633A to 2633C. For the network time, a storage destination 2633D is recorded in place of the de-duplication functions 2633A to 2633C as shown in FIG. 11D. The storage destination 2633D records an hourly based time of period in which the communication network 400 is used for transfer processing when backup target data is stored at ITB destinations A to C. As shown in FIG. 11E, similar to the de-duplication function IDs 2633A to 2633C, de-duplication ratios are recorded in association with the data attribute ID 2631, the data attribute name 2632, and the data de-duplication function ID 2633E. The index tables 2630A to 2630E are set by a system administrator or the like to the shared memory 120 or the storage drive 150 of the server 200 by using the management computer 300 before starting the system. In the data attribute 2632, data not discriminated with a specific extension is collectively sorted to an item of "Others". Such data can be registered additionally to index tables 2630A to 2630D when there arises a necessity of handling a new data attribute independently during system operation.

Next, a data attribute based registration information table 2640 is described. FIG. 12 shows a configuration example of the data attribute based registration information table 2640. The data attribute based registration information table 2640 records a total data size, per data attribute, of data to be subjected to the backup processing in the storage system 1. The data attribute based registration information table 2640 is created by the data analyzing part 2510 of the server 200 before executing a data allocation to a de-duplication function per data attribute.

In an example shown in FIG. 12, the data attribute based registration information table 2640 records a data attribute ID 2641, a data attribute name 2642 and a total data size 2643 in association with each other. The data attribute ID 2641 and the data attribute name 2642 correspond respectively to the data attribute ID 2631 and the data attribute name 2632 in the index tables 2630A to 2630E shown in FIG. 11A to FIG. 11E. The total data size 2643 records a data size, on the MB basis, of data belonging to respective data attributes in the backup target data.

Next, a backup/restore history information table 2650 is described. FIG. 13 shows a configuration example of the backup/restore history information table 2650. The backup/restore history information table 2650 is a table which records information on a backup processing or a restore processing when either of the backup processing or the restore processing is performed in the storage system 1. In the example of FIG. 13, the backup/restore history information table 2650 records an action type 2651, an action ID 2652, a start time 2653, an end time 2654, backup source (restore destination) information 2655, and backup destination (restore source) information 2656.

The action type 2651 records, in a manner identifiable with backup or restore, whether a processing executed in the storage system 1 is the backup processing or the restore processing. The action ID 2652 is an identifier for enabling mutual identification of a backup or restore processing identified by an associated action type 2651. For example, as shown in FIG. 13, in the case that a backup processing is executed twice, a different number is provided to each action ID 2651. On the other hand, when the restore processing identified by the action ID 001 is executed, the action ID 2652 of the restore history information is provided with the action ID 2652 corresponding to the backup processing. The start time 2653 and the end time 2654 respectively record start and end times of a processing identified by an associated backup/restore type 2651. The backup source (restore destination) information 2655 records information of the backup source in the backup processing or information of the restore destination in the restore processing, which further contains a device number and a logical device number. The device number records an identifier which identifies, in an identifiable manner, an apparatus serving as a backup source or a restore destination in the storage system 1, that is, the storage apparatus 100. The logical device number records an identifier which identifies, in an identifiable manner, a logical device serving as a backup source (restore destination) within an associated device number. Here, as described above, the logical device is a logical storage area organized by an appropriate RAID controller from a physical storage area provided by the storage drive 150 provided in an associated storage apparatus 100. A plurality of logical devices can be provided in each of storage apparatuses 100 by dividing the logical device. Backup processing in the storage system 1 is executed on the basis of the logical device. The backup destination (restore source) information 2656 records information of the backup destination in the backup processing or information of the restore source in the restore processing, and the information further contains a device number, a logical device number and additional information storage location information. The device number and the logical device number are same as the device number and the logical device number of the backup source (restore destination) information 2655. For example, as shown in FIG. 13, when information backed up by the backup processing identified with the action ID 2652 of 001 is to be restored, the backup destination information identified with the action ID 2652 of 001 and the backup/restore type 1651 of backup is restore source information. In this case, no information is recorded for the backup destination (restore source) information identified with the action ID 2652 of 001 and the backup/restore type 1651 of restore. The additional information storage location information records a logical address on a logical device which stores additional information 2660 created by the de-duplication processing part 2400 used in a backup processing which is executed to a logical device of a backup source.

Figure 14:
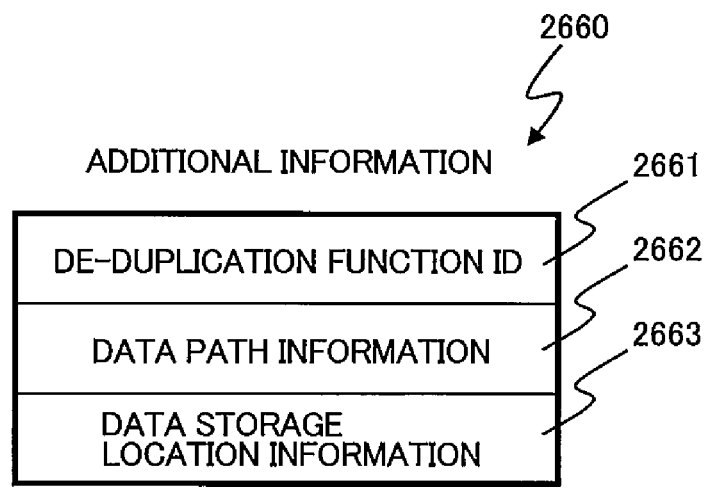
FIG. 14 is a diagram showing a configuration example of additional information 2660.

A configuration example of the additional information 2600 is shown in FIG. 14. The additional information 2660 is information created by a de-duplication processing part 2400 or 1400 which is used for the de-duplication processing in the backup processing. The example of FIG. 14 records a de-duplication function ID 2661, table path information 2662 and data storage location information 2663. The de-duplication function ID 2661 is an identifier for identifying a de-duplication function used in the backup processing. The table path information 2662 is path information of the backup source, and, for example, records path information identified with a file name xxx subjected to the backup processing in a format such as, for example, "C:¥root¥files∅xxx or the like. The data storage location information 2663 records a logical address on a logical device which stores a data storage destination of data comprising a file identified with the data path information 2662.

Figure 5:
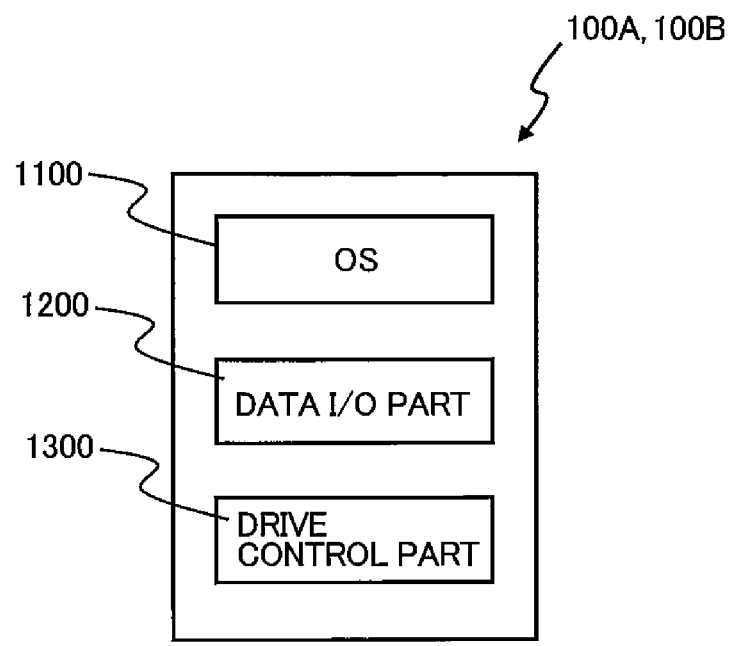
FIG. 5 is a diagram showing a software configuration example of storage apparatuses 100A and 100B not having a de-duplication function.

Software configuration of storage apparatuses 100A to 100D Next, a software configuration of the storage apparatuses 100A to 100D is described. First, FIG. 5 shows a configuration example of the storage apparatuses 100A and 100B. In the example shown in FIG. 5, the storage apparatuses 100A, 100B include an OS 1100, a data I/O part 1200, and a drive control part 1300. As described above with reference to FIG. 1, the storage apparatus 100A includes the logical device LU1 which serves as a backup source of data in the storage system 1, and the storage apparatus 100B includes a logical device LU2 which serves as a backup destination in a backup processing of the source inline type in the storage system 1. Both of the storage apparatuses are not provided with a de-duplication function. Similarly with the case of the server 200, the OS 1100 is basic software serving as the base for executing programs executed in the storage apparatuses 100A and 100B. The data I/O part 1200 is a program which manages, under control of the OS 1100, data I/O processing of programs running in the storage apparatuses 100A and 100B. The drive control part 1300 has a function of producing a logical storage device having a desired storage capacity by controlling the storage drive 150 of the storage apparatuses 100A and 100B in an appropriate RAID format.

Figure 6:
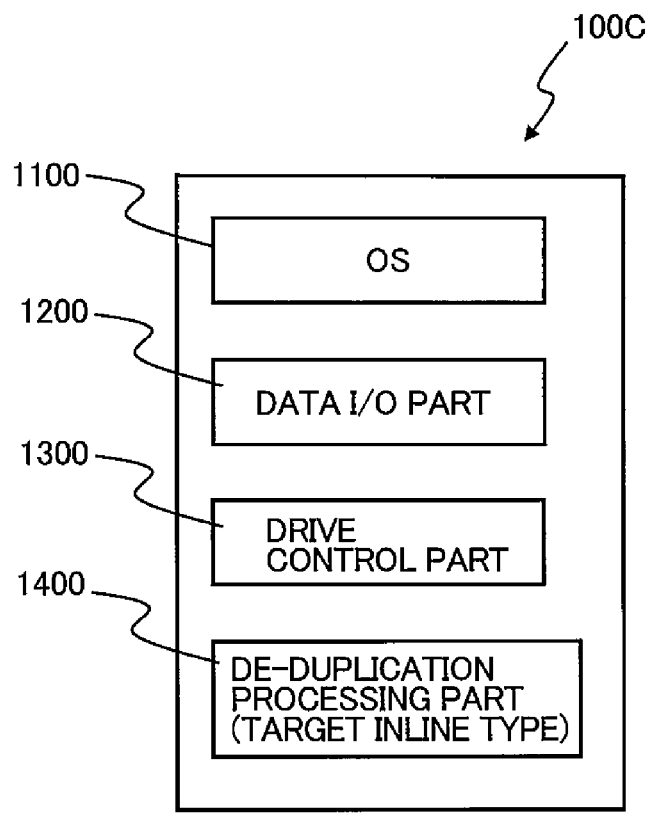
FIG. 6 is a diagram showing a software configuration example of a storage apparatus 100C having a target inline type de-duplication function.

FIG. 6 shows a configuration example of the storage apparatus 100C. As illustrated in FIG. 6, the storage apparatus 100C is different from the storage apparatuses 100A and 100B in that a de-duplication processing part 1400 is provided. As discussed with reference to FIG. 1, the storage apparatus 100C includes the logical device LU3 which serves as a backup destination of the target inline type backup processing in the storage system 1, and causes the de-duplication processing part 1400 to execute the de-duplication processing in the target inline type backup processing.

Figure 7:
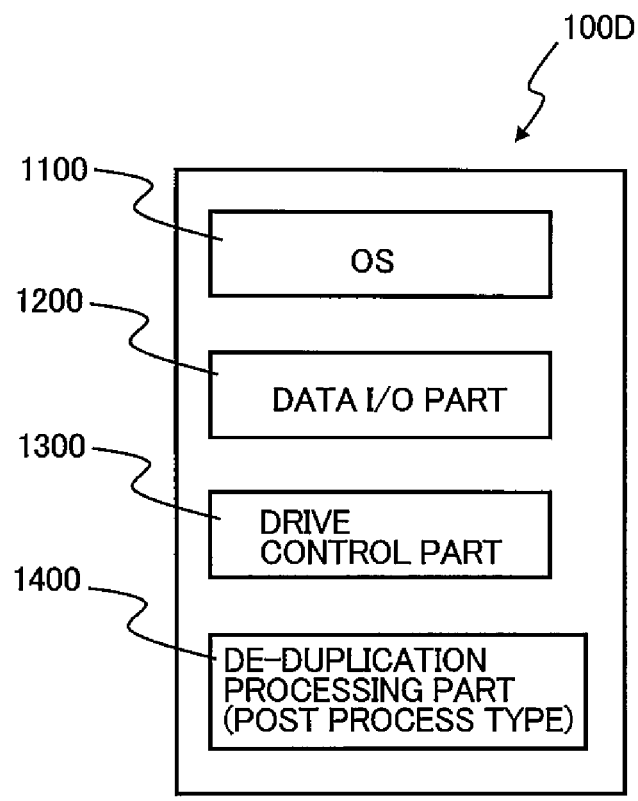
FIG. 7 is a diagram showing a software configuration example of a storage apparatus 100D having a post process type de-duplication function.

FIG. 7 shows a configuration example of the storage apparatus 100D. As illustrated in FIG. 7, the storage apparatus 100D is different from the storage apparatuses 100A and 100B in that the de-duplication processing part 1400 is provided, similarly with the storage apparatus 100C. As described with reference to FIG. 1, the storage apparatus 100D includes the logical device LU4 which serves as a backup destination of the post process type backup processing in the storage system 1, and the temporary storage area LUT for temporarily storing the backup target data, and causes the de-duplication processing function 1400 to execute the de-duplication processing in the post process type backup processing.

Software Configuration of Management Computer 300

Figure 8:
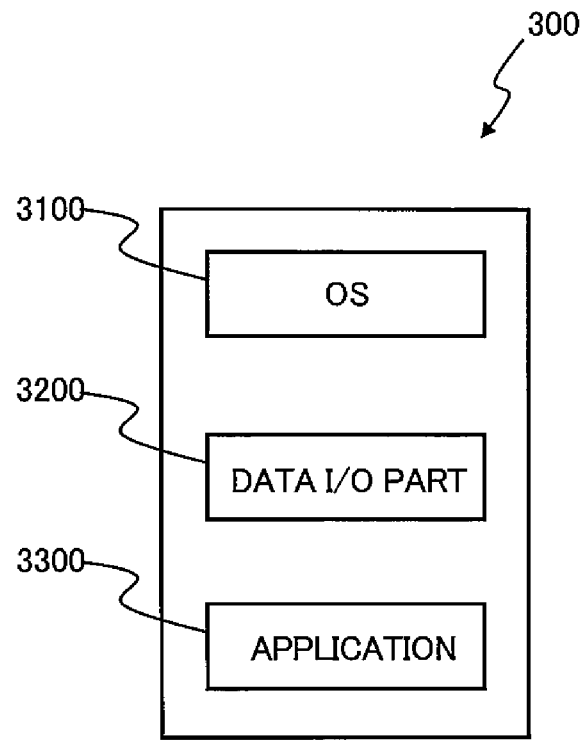
FIG. 8 is a diagram showing a software configuration example of the management computer 300.

Next, a software configuration of the management computer 300 is described. FIG. 8 shows a configuration example of the management computer 300. In the example of FIG. 8, the management computer 300 includes an OS 3100, a data I/O part 3200 and an application 3300.

The OS 3100 is basic software which serves as an execution base of various programs executed in the management computer 300, and can be used by selecting out of various OSs generally used as a computer OS. The data I/O part 3200 manages, under control of the OS 3100, data I/O processing to programs operated by the management computer 300.

The application 3300 includes programs for executing, as the management computer 300, operation commands to the server 200 or the storage apparatuses 100A to 100D, operation state information output processing from the server 200 or the storage apparatuses 100A to 100D, and the like. The programs include, for example, a browser for data I/O to and from the server 200 or the storage apparatuses 100A to 100D via the communication network 400, and the like.

General description of de-duplication function allocation processing to backup target data in present embodiment Next, a basic concept regarding the allocation of backup target data to a de-duplication function adopted in the present embodiment is outlined. In the present embodiment, processing of allocating backup target data to a different type de-duplication function per data attribute is executed so as to complete the backup processing in the storage system 1 within a backup processing time window predetermined by the user. Here, Mikito Ogata, Norihisa Komoda, "Optimised assignment of deduplication backup methods using integer programming", JCIS2011, 2011 is incorporated herein by reference.

When allocating backup target data to a de-duplication function implemented in the storage system 1, a trade-off occurs among a removed data amount, a processing time and a resource load.

First, in the source inline type, only backup target data subjected to the de-duplication processing is transmitted via the communication network 400. Therefore, network load applied by data transmission is smaller compared with the target inline type which transmits all data from a backup source to a backup destination.

In the source inline type and the target inline type, de-duplication processing is performed in synchronization with data transmission and thereby data transmission takes a longer time, but the de-duplication processing completes at the same time when transmission completes. In the post process type, the de-duplication processing does not yet complete when transmission completes.

In the source inline type, metadata such as a hash value or the like needs to be communicated with a backup destination in order to determine a possibility of duplication. When backup target data has less possibility of the duplication, the communication time used therefor rather affects performance. Therefore, the target inline type not requiring such communication is more advantageous.

In the post process type, an overhead occurs for temporarily storing backup target data in the temporary storage area LUT. But, de-duplication processing is performed asynchronously with respect to data transmission, and thereby a fine de-duplication processing generally requiring a longer processing time is possible.

An algorithm excellent for removed data amount takes a longer processing time, and efficiency of the algorithm largely depends on the data attribute to be processed.

In the present embodiment, the backup time, which is time needed for backup processing, is utilized by formulating as below in order to complete the backup processing within a predetermined time window while balancing advantages and disadvantages of the backup types described above. The purpose of controlling the backup time within a predetermined time window is to achieve maximum data conservation while minimizing effects on routine works. In terms of methods, in the source inline type and target inline type, de-duplication processing completes when data transmission for backup ends, so that the backup window is a time constraint on transmission and removal. On the other hand, in the post process type, data conservation to works on the client side can be guaranteed if data transmission completes and backup target data is stored in the temporary storage area LUT. In this case, data transmission from the client side and conservation thereof may complete within a backup window, and the de-duplication processing can be performed asynchronously after the storage apparatus 100D serving as the backup destination receives the data. The constraint formula for the backup time BackUpTime with a time length limited for backup processing or the backup window as Win0 is shown below.

[Formula 1]

$$BackUpTime = \sum_{i=1}^{n} \sum_{j=1}^{k} Time0(i, j)V(i)X(i, j) \leq Win0, \quad (1)$$

The constraint formula for the cleaning time CleaningTime is shown below where the time width limited to cleaning processing is set Index ID=1 in constraint table 2620 (Cleaning time):

[Formula 2]

$$CleaningTime = \sum_{i=1}^{n} \sum_{j=1}^{k} Time1(i, j)V(i)X(i, j) \quad (2)$$

$$\leq \text{Index } ID = 1 \text{ in constraint table 2620 (Cleaning time)}$$

formula for the restore time RehydrationTime is shown below where the time width limited to restore processing is set Index ID=2 in constraint table 2620 (Restore time):

[Formula 3]

$$RehydrationTime = \sum_{i=1}^{n} \sum_{j=1}^{k} Rehyd(i, j)V(i)X(i, j) \quad (3)$$

$$\leq \text{Index } ID = 2 \text{ in constraint table 2620 (Restore time)}$$

The constraint formula for the network time LanXfer is shown below where the time width limited to network processing is set Index ID=3 in constraint table 2620 (Network time):

[Formula 4]

$$LanXfer = \sum_{i=1}^{n} \sum_{j=1}^{k} Lan(i, j)V(i)X(i, j) \quad (4)$$

$$\leq \text{Index } ID = 3 \text{ in constraint table 2620 (Network time)}$$

The constraint formula for the reduced data amount by de-duplication is shown below:

[Formula 5]

$$\max \left| Dr = \sum_{i=1}^{n} \sum_{j=1}^{k} Sdedup(i, j)V(i)X(i, j) \right| \quad (5)$$

Here, i represents the data attribute, n=5 according to the present embodiment, j represents a type of de-duplication function with k=3 in the present embodiment, Time 0 (i, j) represents a backup time for backup processing of data having an attribute i by the de-duplication function j, V(i) represents backup target data amount of the attribute i, and X (i, j) is 1 or 0, wherein when the attribute i is allocated to the de-duplication function j, X(i, j)=1, and otherwise, X(i, j)=0. Total backup time for entire backup target data can be calculated from the Formula 1.

Figure 15:
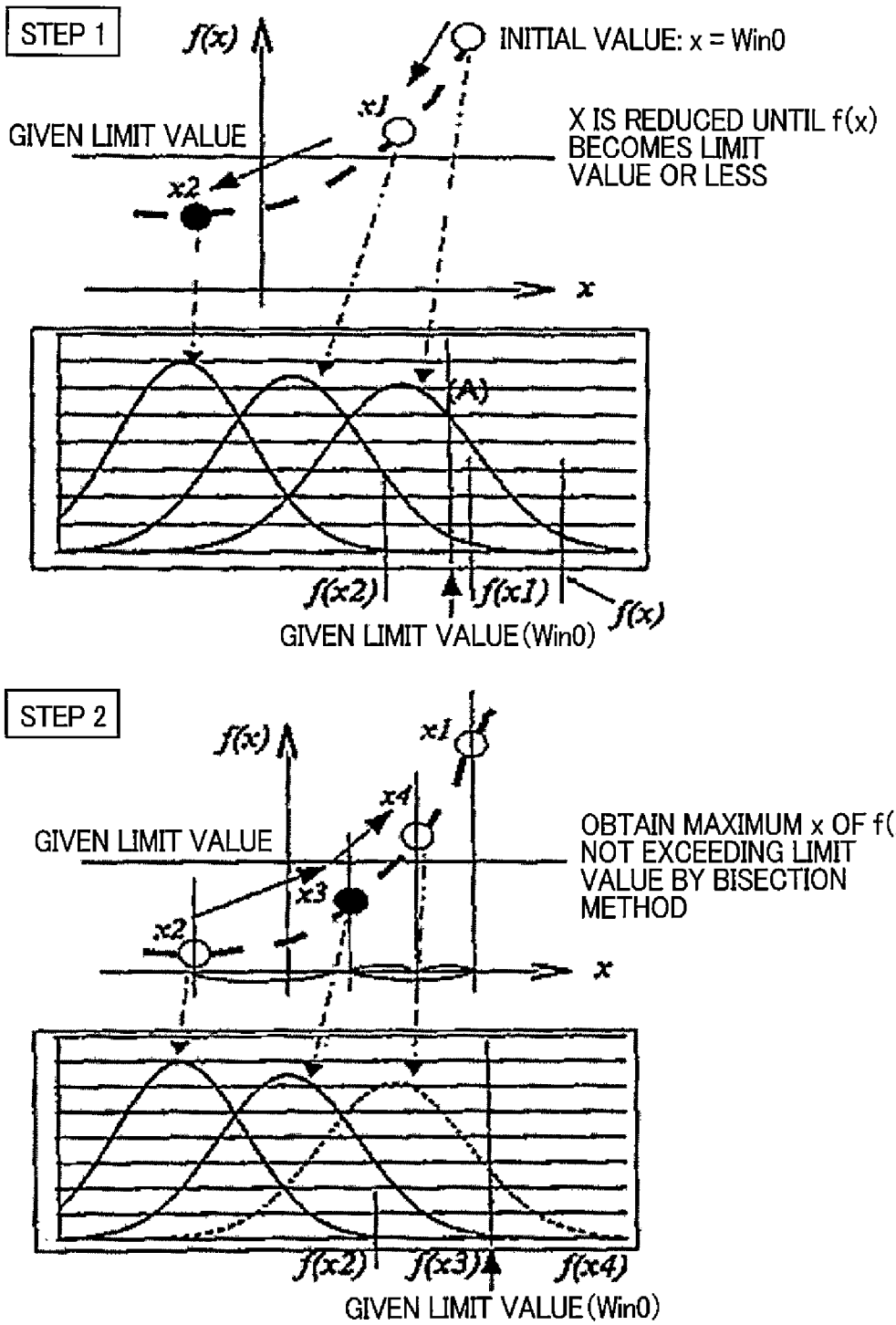
FIG. 15 is a diagram schematically showing a principle of de-duplication function allocation processing per data attribute by an integer programming executed in the storage system 1.

Next, with reference to FIG. 15, a method of allocating the backup target data in a manner satisfying the backup time constraint in the storage system 1 is described. FIG. 15 schematically shows a principle of the de-duplication function allocation processing per data attribute by an integer programming executed in the storage system 1.

An optimum solution is obtained by two steps including Steps 1 and 2. Referring to Step 1 of FIG. 15, an allocation maximizing the de-duplication amount of the entire system is obtained by using the integer programming on the initial value x=Win0 and other limit values. At this time, it is assumed that distribution of the backup time is (A). "f(x)" significantly exceeds Win0 which is a given limit value and fails to satisfy the limit of the variation. Therefore, as a next step, the allocation is obtained again with a new limit value by subtracting an excess of f(x)−Win0 from x. Here, f(x) is a monotonous increasing function with respect to x. Thus, x can be reduced from the initial state of f(x)>Win0 until f(x)≦Win0. The example of FIG. 15 shows f(x2) Win0. Further, a de-duplication amount higher than a predetermined threshold may be used as a condition for determining the solution.

Next, the process proceeds to Step 2. In the execution example at the preceding Step 1, two values of f(x1)≧Win0 and f(x2)≦Win0 are obtained. At this time, there is no guarantee that x2 is an optimum solution, and there is a possibility that a true optimum solution maximizing the removal amount exists between x1 and x2. The purpose of Step 2 is to find an allocation having the value of f smaller than and closest to Win0 by starting from x1 and x2 obtained at Step 1. Here, since the value which f(x) can take is discrete, the bisection method as a continuous function cannot be used. Even if the input x is varied, f(x) may not vary in some cases. On the other hand, the allocation may vary significantly with respect to a slight variation of x, and thereby f(x) may vary in a stepped manner. In this method, utilizing that f(a)≦f(b) holds true when a<b and that f is a broadly monotonically increasing discrete function, an optimum solution is figured out by determining whether or not the value of f(x) varies. In the example of FIG. 15, x3 representing a mean value of x1 and x2 is taken to determine f(x3). Since f(x3)≦Win0, next, x4 representing a mean value of x1 and x3 is taken to determine f(x4). Then, f(x4)≧Win0 is obtained. Hereinafter, a solution between x3 and x4 is searched for. The search is iterated until an interval of the bisection method becomes a sufficiently small value ϵ or less. If there is no variation of f(x), the search ends. Here, since f is a broadly monotonically increasing function, existence of the optimum value and end of the step is assured.

Figure 16A:
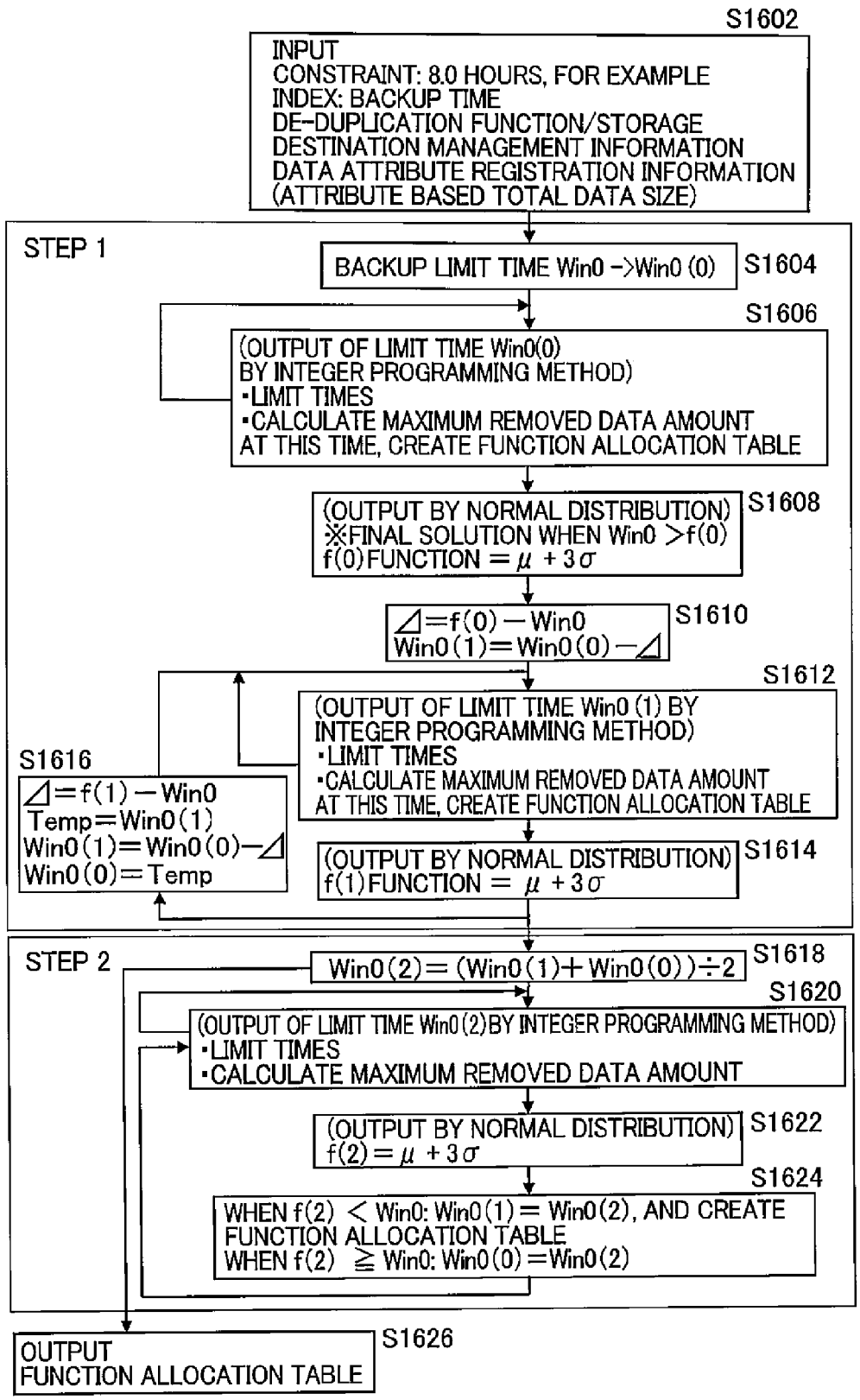
FIG. 16A is a diagram showing a method of the integer programming executed in the storage system 1.

The backup target data allocation method using the integer programming according to the present embodiment outlined above is shown in FIG. 16A as a specific process flow, and a result calculation example according to the process flow is shown in FIG. 16B. First, referring to FIG. 16A, processing of Step 1 is executed. In Step 1, search intervals Win0(0) and Win0(1) for obtaining an optimum value by the integer programming is determined. Inputs of this allocation processing are contents of the constraint table 2620, contents of the index table for backup time 2630A, contents of the de-duplication function/storage destination management information table 2610, and contents of the data attribute based registration information table 2640 (S1602). Next, according to the present embodiment, the constraint of the backup time is assumed as 8.0 hours, which is, therefore, used as an initial value of Win0(0) (S1604).

Figure 17E:
FIG. 17E is a diagram showing a configuration example of an integer programming result table for de-duplication rate 2670E.

Next, at S1606, a combination achieving a maximum data removal amount when backup target data is subjected to the de-duplication processing by a de-duplication function based on the data attribute thereof is obtained from the index tables 2630A-2630E and the data attribute based registration information table 2640. Result of the obtained solution is shown in the integer programming result tables 2670A-2670E for backup time in FIG. 17A. The integer programming result table 2670A shows backup times for backup target data backed up by specific de-duplication functions per data attributes. The integer programming result table 2670B shows restore times for backup target data restored by specific de-duplication functions per data attributes. The integer programming result table 2670C shows cleaning times for backup target data backed up by specific de-duplication functions per data attributes. The integer programming result table 2670D shows network times for backup target data backed up by specific de-duplication functions per data attributes. The integer programming result table 2670E shows maximum data removal amounts for backup target data backed up by specific de-duplication functions per data attributes. At Step S1606, the de-duplication function allocation result table 2690 is temporarily created in accordance with a combination achieving a maximum data removal amount. FIG. 19 shows a configuration example of the de-duplication function allocation result table 2690. The de-duplication function allocation result table 2690 records a data attribute ID 2691, a data attribute name 2692 and a de-duplication function ID 2693 in association with each other.

Figure 18:
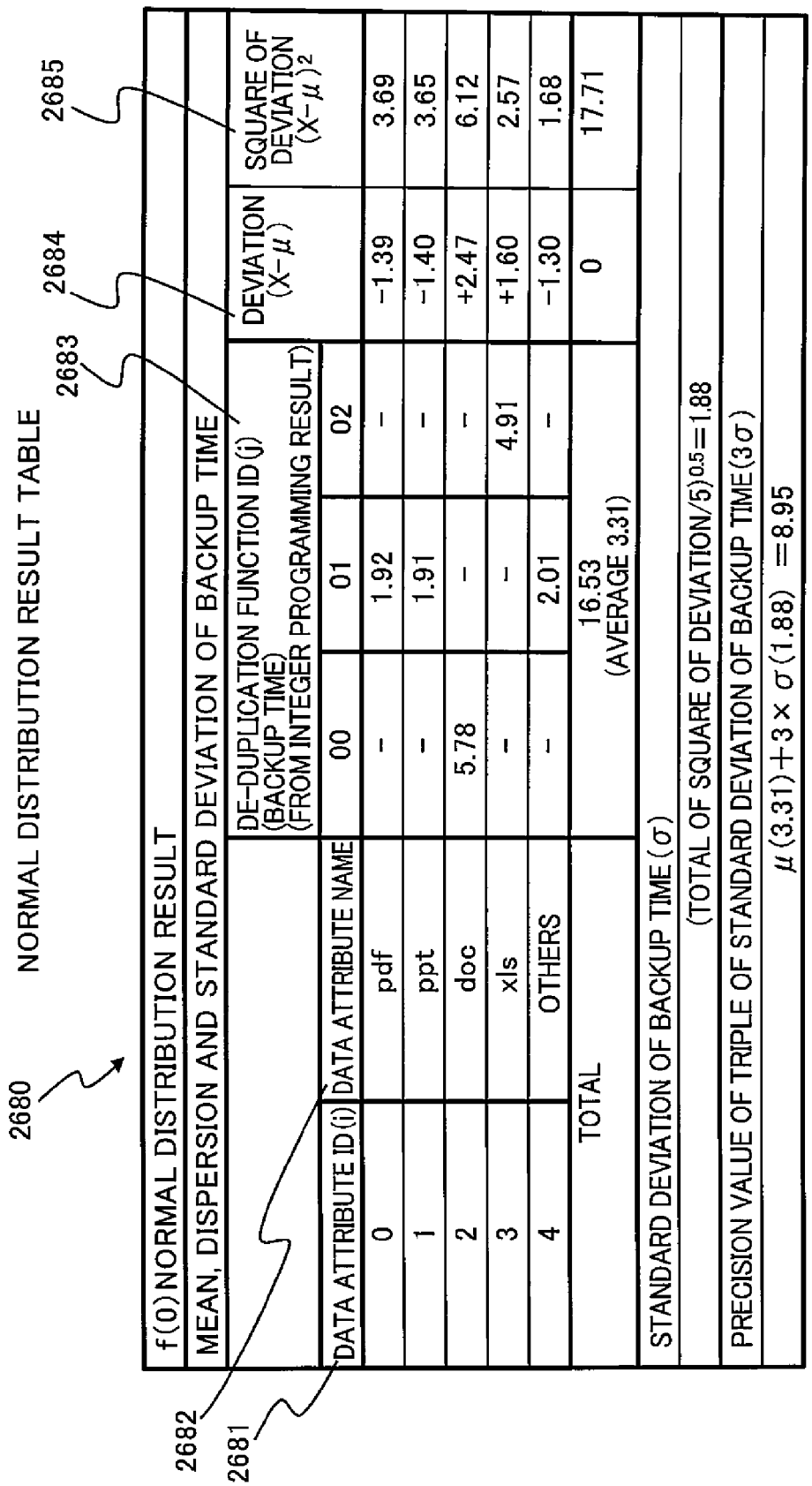
FIG. 18 is a diagram showing a configuration example of a normal distribution result table 2680.

Further, at S1608, from a backup time mean value μ and a standard deviation σ of normal distribution when assumed that the backup time is normally distributed, f(0) function=μ+3σ covering 99.7% of a varying backup time is calculated. FIG. 18 shows a configuration example of the normal distribution result table 2680. The normal distribution result table 2680 is created on the basis of the integer programming result table 2670, and records a data attribute 2681, a data attribute name 2682, a backup time per de-duplication function per data attribute 2683, a deviation 2684, and a square of deviation 2685, based on that values of the backup time are normally distributed. In the configuration example of FIG. 18, the data attribute 2681, the data attribute name 2682 and the backup time per data attribute per de-duplication function 2683 are the same as those of the integer programming result table 2670A of FIG. 17A, and on which basis, the data attribute based backup time mean value and the standard deviation are calculated.

Next, at S1610, Δ=f(0)−Win0 (=8.95−8.0)=0.95 and Win0 (1)=Win0(0)−Δ (=8.0−0.95)=7.05 are calculated. At S1612 and S1614, an output as f(1) function is calculated by the integer programming at S1606 and the normal distribution at S1608. Here, if f(1) function>upper limit (8.0 hours) of the backup time, Δ=f(1)−Win0 is calculated at S1616, and the process returns to S1612 with Win0(1)=Win0(0)−Δ and Win0 (0)←Win0(1). Then, steps S1612 through S1616 are iteratively executed until f(0)≦Win0 holds true.

If f(0)≦0 holds true at Step 1, the process shifts to Step 2 of FIG. 16A. At Step 2, an objective function is obtained by sequentially reducing the initial search interval determined at Step 1 with the bisection method applied to the search interval. First, at S1618, Win0(2)=(Win0(1)+Win0(0))/2 is calculated to obtain one end point of the search interval by the bisection method. In a calculation example of TRY3 of FIG. 16B, Win0(2)=(7.05+8.00)/2=7.52.

Next, at S1620 and S1622, an output as f(2) function is calculated by the integer programming of S1606 and the normal distribution of S1608. Next, at S1624, if f(2)<Win0, the de-duplication function allocation table 2690 is created by assuming that Win0(1)←Win0(2). If f(2)≧Win0, an upper limit value of the backup time is not satisfied, and therefore the process returns to S1620 with Win0(0)←Win0(2).

FIG. 16B shows that the search interval satisfying an upper limit value of the backup time is determined by the integer programming described above, and then an optimum solution for the allocation of backup target data to the de-duplication function is obtained while further narrowing the search interval by the bi-section method. An example of FIG. 16B shows that the de-duplication function allocation result table 2690 satisfying a backup time upper limit value Win0 was obtained in a fifth trial (TRY5). The optimum value may be obtained by using a method other than the bi-section method.

Figure 20:
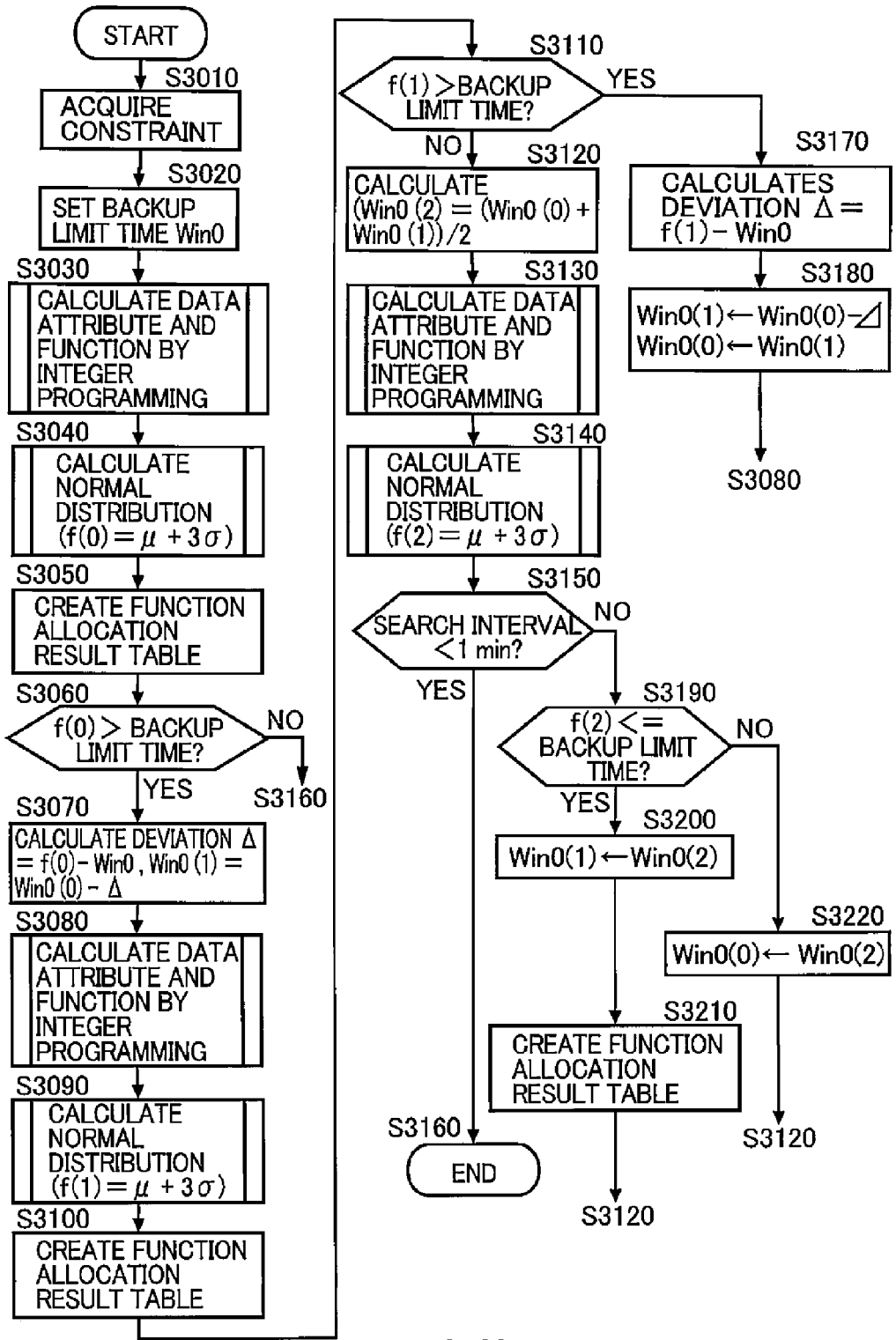
FIG. 20 is a flowchart showing a process flow example of an allocation control processing executed in the storage system 1.

Allocation control processing of backup target data Next, allocation control processing according to the present embodiment to which the backup target data allocation method according to the present embodiment described above is applied is described. FIG. 20 shows an example of an allocation control processing flow in the storage system 1. An allocation control processing illustrated in FIG. 20 achieves the allocation method described with reference to FIG. 16A by using the data analyzing part 2510 and the allocation control part 2520. First, The data analyzing part 2510 analyzes backup target data stored in the storage apparatus 100A which is a backup source, to obtain total data size per data attribute, and creates the data attribute based registration information table 2640. If already the data attribute based registration information table 2640 has been created, the data analyzing part 2510 updates the existing data attribute based registration information table 2640 based on the result of the executed data analysis. The allocation control part 2520 acquires a backup time constraint and a backup time per required data amount of respective data attributes with reference to the constraint table 2620 and the index table 2630A (S3010). Next, the allocation control part 2520 sets the backup limit time Win0 on the basis of the constraint table 2620 (S3020). The backup limit time according to the present embodiment is Win0=8.0 hours as described above.

Next, the allocation control part 2520 calculates, by the integer programming, a de-duplication function used per data attribute and a backup time by the de-duplication functions, and creates the integer programming result table 2670A (S3030). Then, based on the integer programming result table 2670A, the allocation control part 2520 calculates f(0) function=$\mu$+3$\sigma$ (S3040). Steps S3030 and S3040 correspond respectively to steps S1606 and S1608 in FIG. 16A. The allocation control part 2520 creates the de-duplication function allocation result table 2690 according to the result of S3040 (S3050).

Here, the allocation control part 2520 determines whether or not a value of the f(0) function exceeds the backup limit time Win0 (S3060). If determined that the value exceeds (S3060: No), the process ends immediately since the final result of a maximum data removal amount satisfying the all constraints has been obtained (S3160). If determined that the value of the f(0) function is the backup limit time Win0 or less (S3060: Yes), the allocation control part 2520 calculates the deviation $\Delta$=f(0)−Win0, and calculates another end point of the search interval Win0(1)=Win0(0)−$\Delta$ (S3070).

Next, the allocation control part 2520 calculates, by the integer programming, a de-duplication function used per data attribute and a backup time by the de-duplication function, and creates the integer programming result tables 2670A-2670E (S3080). Then, based on the integer programming result table 2670A, the allocation control part 2520 calculates f(1) function=$\mu$+3$\sigma$ (S3090). Steps S3080 and S3090 correspond respectively to Steps S1612 and S1614 in FIG. 16A. The allocation control part 2520 creates the de-duplication function allocation result table 2690 according to the result of S3040 (S3100).

Next, the allocation control part 2520 determines whether or not a value of the f(1) function exceeds the backup limit time Win0 (S3110). If determined that the value exceeds (s3110: Yes), the allocation control part 2520 calculates the deviation $\Delta$=f(1)−Win0 and returns the process to S3080 with Win0(1)←Win0(0)−$\Delta$ and Win0(0)←Win0(1).

If determined that the value of the f(1) function is the backup limit time Win0 or less (S3110: No), the allocation control part 2520 shifts to a processing of the bi-section method narrowing a length of the search interval and calculates Win0(2)=(Win0(0)+Win0(1))/2 (S3120). Next, the allocation control part 2520 calculates, by the integer programming, a de-duplication function used per data attribute and a backup time by the de-duplication function and creates the integer programming result table 2670 (S3130). Then, based on the integer programming result table 2670A, the allocation control part 2520 calculates the f(2) function=$\mu$+3$\sigma$ (S3140). Steps S3130 and S3140 correspond respectively to Steps S1620 and S1622 in FIG. 16A.

Next, the allocation control part 2520 determines whether or not the length of the search interval becomes 1 minute or less (S3150). If determined that the length is 1 minute or less (S3150: Yes), the object of allocating the backup target data is achieved and the process ends (S3160). If determined that the length of the search interval is not less than 1 minute (S3150: Yes), the allocation control part 2520 further determines whether or not a value of the f(2) function is the backup limit time Win0 or less (S3190). If determined that the value of the f(2) function is the backup limit time Win0 or less (S3190: Yes), the allocation control part 2520 creates the de-duplication function allocation result table 2690 with Win0 (1)←Win0(2) (S3200) and returns the process to S3120 (S3210). If determined that the value of the f(2) function exceeds the backup limit time Win0 (S3190: No), the allocation control unit 2520 returns the process to S3120 with Win0(0)←Win0(2) (S3220).

According to the allocation control processing of the present embodiment described above, backup target data can be allocated to an appropriate de-duplication function per data attribute on the condition that a backup limit time Win0 predetermined by the storage system 1 is not exceeded, whereby the storage system 1 can be operated more efficiently.

Figure 21:
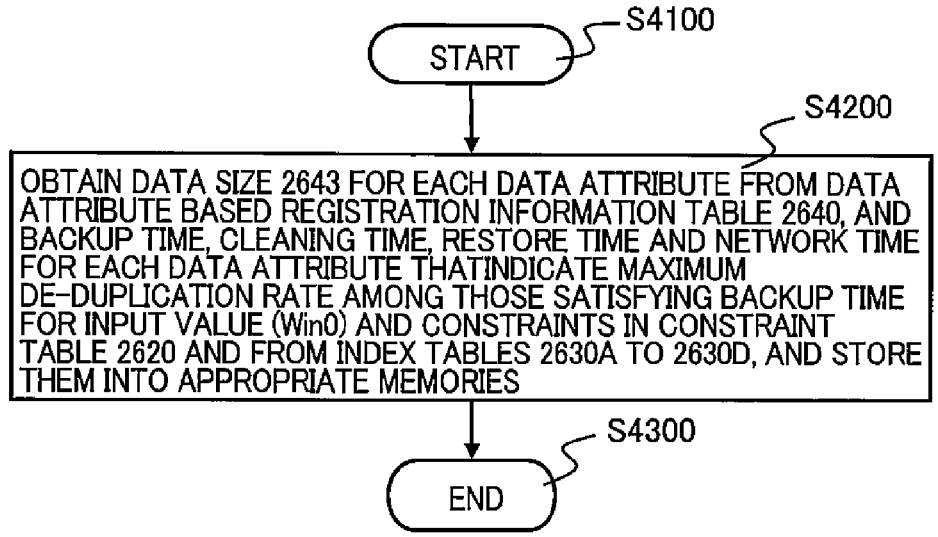
FIG. 21 is a flowchart showing a process flow example of an integer programming information acquisition processing executed in the allocation control processing.

Next, with reference to the allocation control processing of FIG. 20, an integer programming information acquisition processing performed by the allocation control part 2520 before executing Step S3030 by the integer programming is described. FIG. 21 shows an example of the integer programming information acquisition processing flow. The integer programming information acquisition processing is a process for collecting data used for a process executed by the allocation control part 2520 according to the integer programming, and is executed, for example, at S3010 of FIG. 20. After starting the process at S4100, the allocation control part 2520 determines, at S4200, the data size 2643 per data attribute from the data attribute based registration information table 2640, and the backup time, the cleaning time, the restore time, the network time, and the maximum data removal amount satisfying the constraints from the input backup limit time (Win0) and the index tables 2630A to 2630E for de-duplication functions per data attribute, stores them into appropriate memories and ends the process (S4300).

Figure 22:
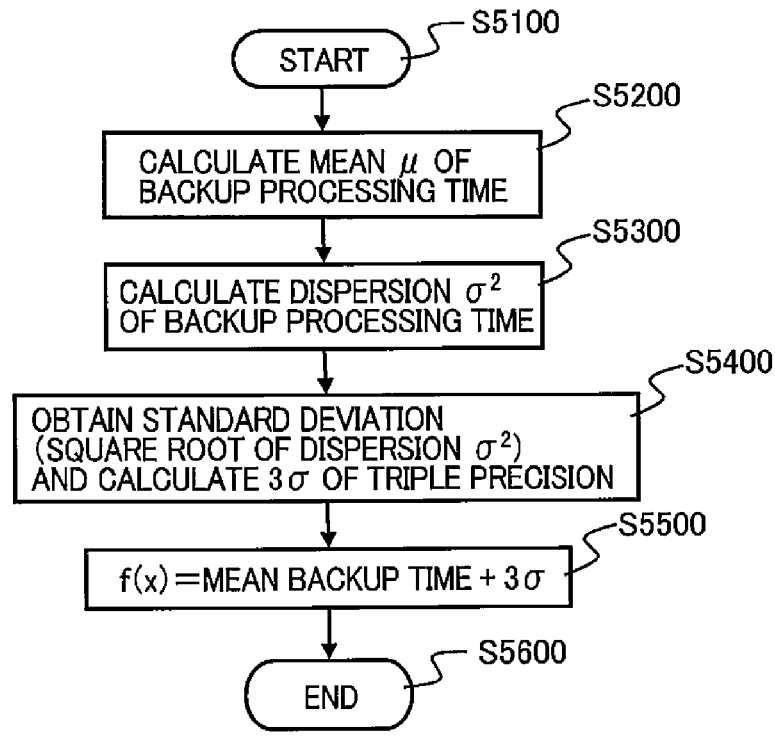
FIG. 22 is a flowchart showing a process flow example of a normal distribution calculation information acquisition processing executed in the allocation control processing.

Next, with reference to the allocation control processing shown in FIG. 20, a normal distribution calculation information acquisition process for determining a value of the f(x) function is described. FIG. 22 shows an example of the normal distribution calculation information acquisition process flow. The allocation control part 2520, which, for example, starts the process at S3040 of FIG. 20, first calculates a mean value $\mu$ of backup processing times with reference to the integer programming result table 2670 (S5200). Next, the allocation control part 2520 calculates a dispersion o and a standard deviation $\sigma$ of the backup processing time (S5300, S5400) similarly with reference to the integer programming result table 2670 (S5500), calculates f(x)=$\mu$+3$\sigma$, and ends the process (S5600).

Figure 23:
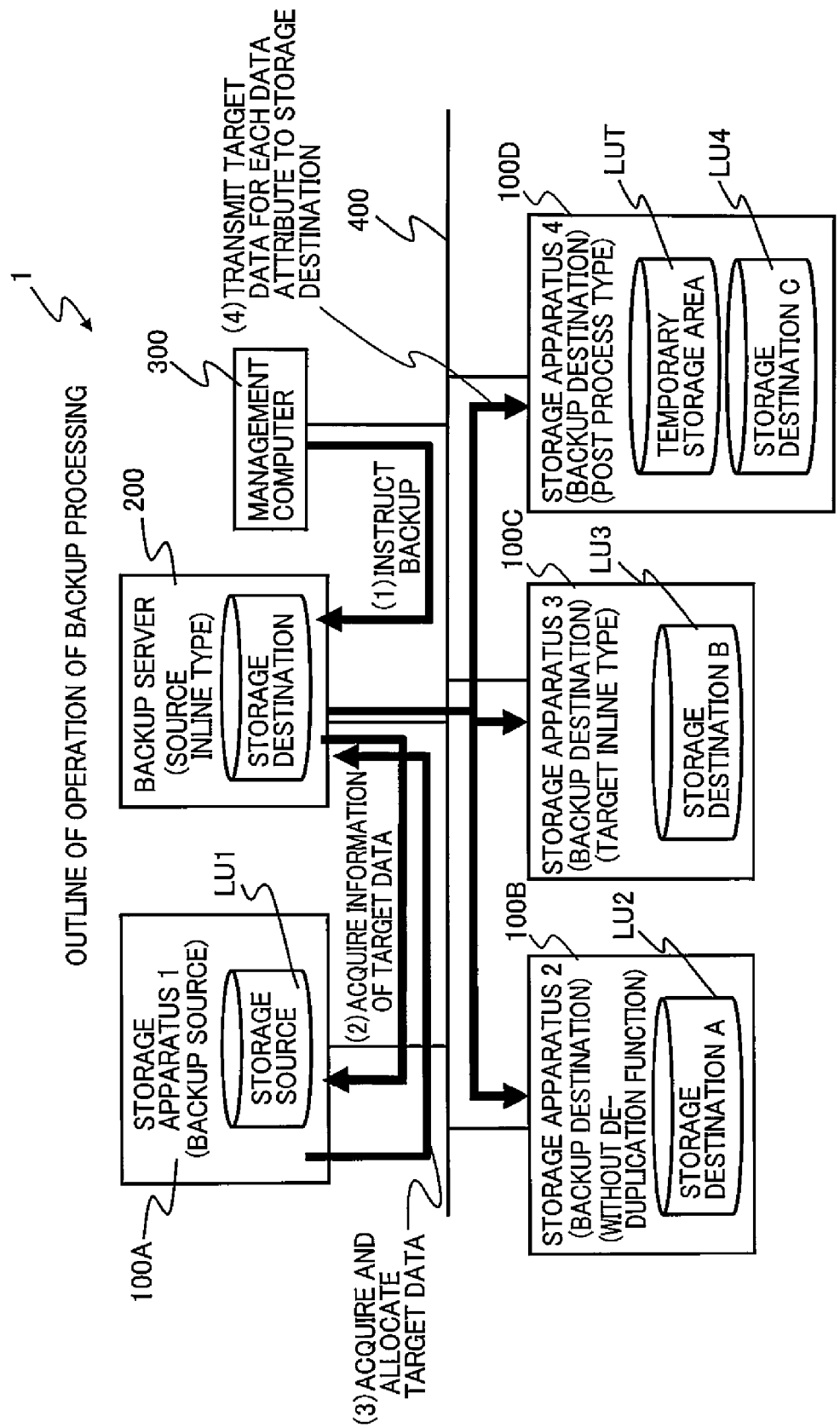
FIG. 23 is a diagram schematically showing a backup processing executed in the storage system 1.

Backup processing and restore processing in storage system 1 Next, a backup processing and a restore processing in the storage system 1 provided with the allocation control function for the backup target data described above are described. First, the backup processing in the storage system 1 is described with reference to FIG. 23 and FIG. 24. FIG. 23 is a diagram schematically showing a backup processing in the storage system 1, and FIG. 24 is a flowchart showing an example of a process flow in the backup processing.

Referring to FIG. 23, in the backup processing in the storage system 1, the above allocation control processing is executed by the server 200 according to a backup execution command sent from the management computer 300 to the server 200, and data stored in the storage apparatus 100A is stored, according to allocation control processing result thereof, into a storage destination of storage apparatuses 100B to 100D.

Figure 24:
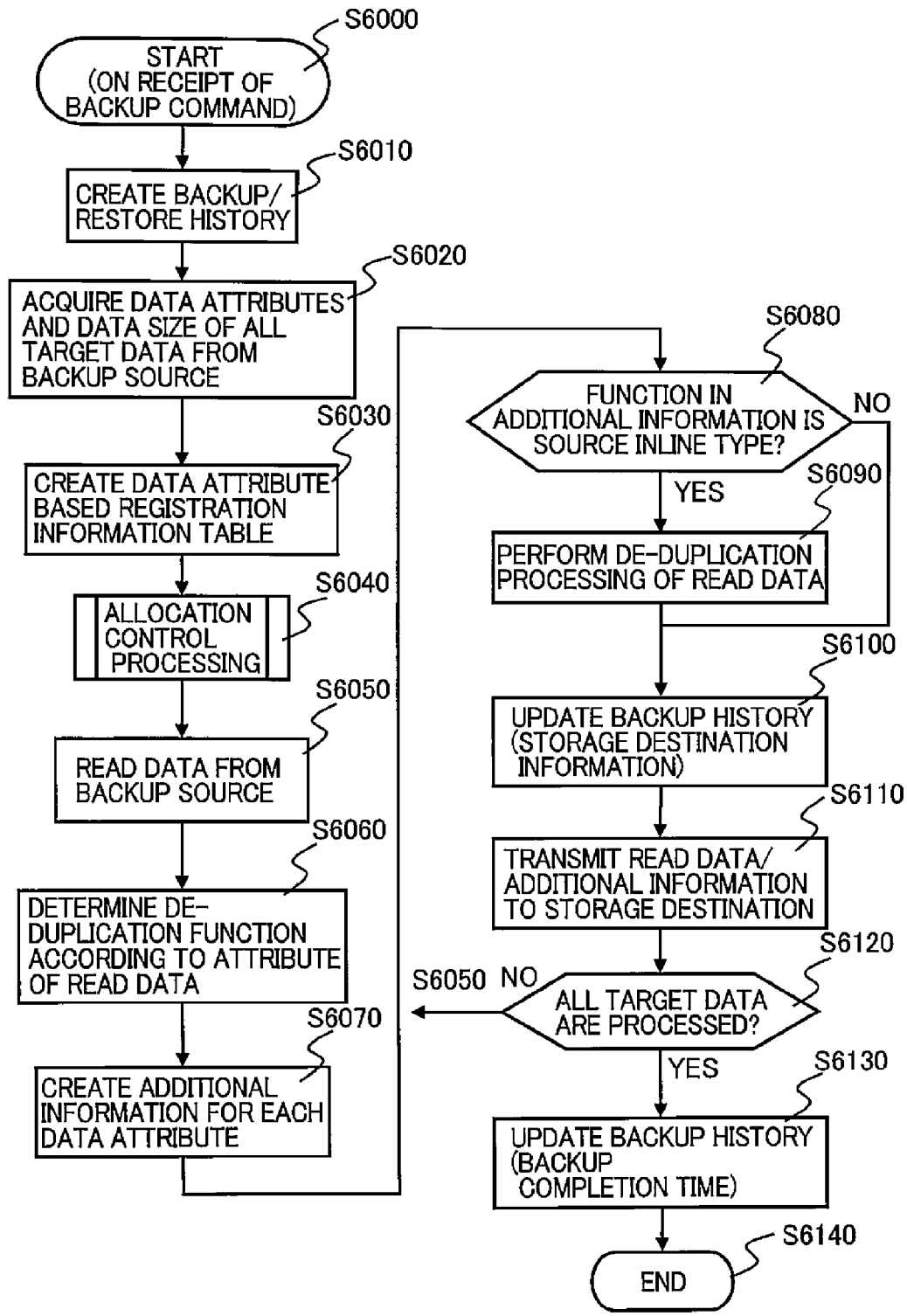
FIG. 24 is a diagram showing a process flow example of the backup processing.

Referring to FIG. 24, a backup processing part 2530 of the server 200, which received a backup processing execution command from the management computer 300 or the like and started the process (S6000), registers a new backup history record in the backup/restore history information table 2650 and records the start time 2653 (S6010). Next, the data analyzing part 2510 acquires data attributes and data sizes per data attribute of all backup target data from the storage apparatus 100A which is a backup source (S6020), and creates the data attribute based registration information table 2640

(S6030). Next, the allocation control part 2520 of the server 200 executes the allocation control processing of FIG. 20 and creates the de-duplication function allocation result table 2690 (S6040). As the allocation control processing has been executed as described above, it is ensured that a backup processing being executed substantially completes within a limit time.

Next, the backup processing part 2530 reads data sequentially from the storage apparatus 100A which is a backup source (S6050), determines an applied de-duplication function according to the read data attribute, and creates additional information 2660 on the basis of the data attribute (S6060, S6070).

Next, the backup processing part 2530 determines according to the de-duplication function ID recorded in the additional information 2660 whether or not target data is data which should be processed by the source inline type (S6080). If determined that target data is data which should be processed by the source inline type (S6080: Yes), the de-duplication processing part 2400 of the server 200 executes de-duplication processing (S6090). If determined that target data is data which should not be processed by the source inline type (S6080: No), the process proceeds to S6100.

At S6100, the backup processing part 2530 updates the backup/restore history information table 2650 by recording the backup destination information 2656 relative to the target data, and transmits the target data and additional information 2660 thereof to the storage apparatus 100B, 100C or 100D, which is a backup destination (S6110).

Next, the backup processing part 2530 determines whether or not processing of the backup target data has completed (S6120). If determined that the processing has not completed (S6120: No), the process returns to S6050. If determined that the processing has completed (S6120: Yes), the backup processing part 2530 updates the backup/restore history information table 2650 by recording the backup end time 2654 thereto (S6130), and ends the process (S6140).

According to the backup processing of the present embodiment described above, an appropriate de-duplication processing may be applied per data attribute of the backup target data while satisfying a constraint on the backup time predetermined for operations of the storage system 1, whereby the storage system 1 can be operated more efficiently.

Figure 25:
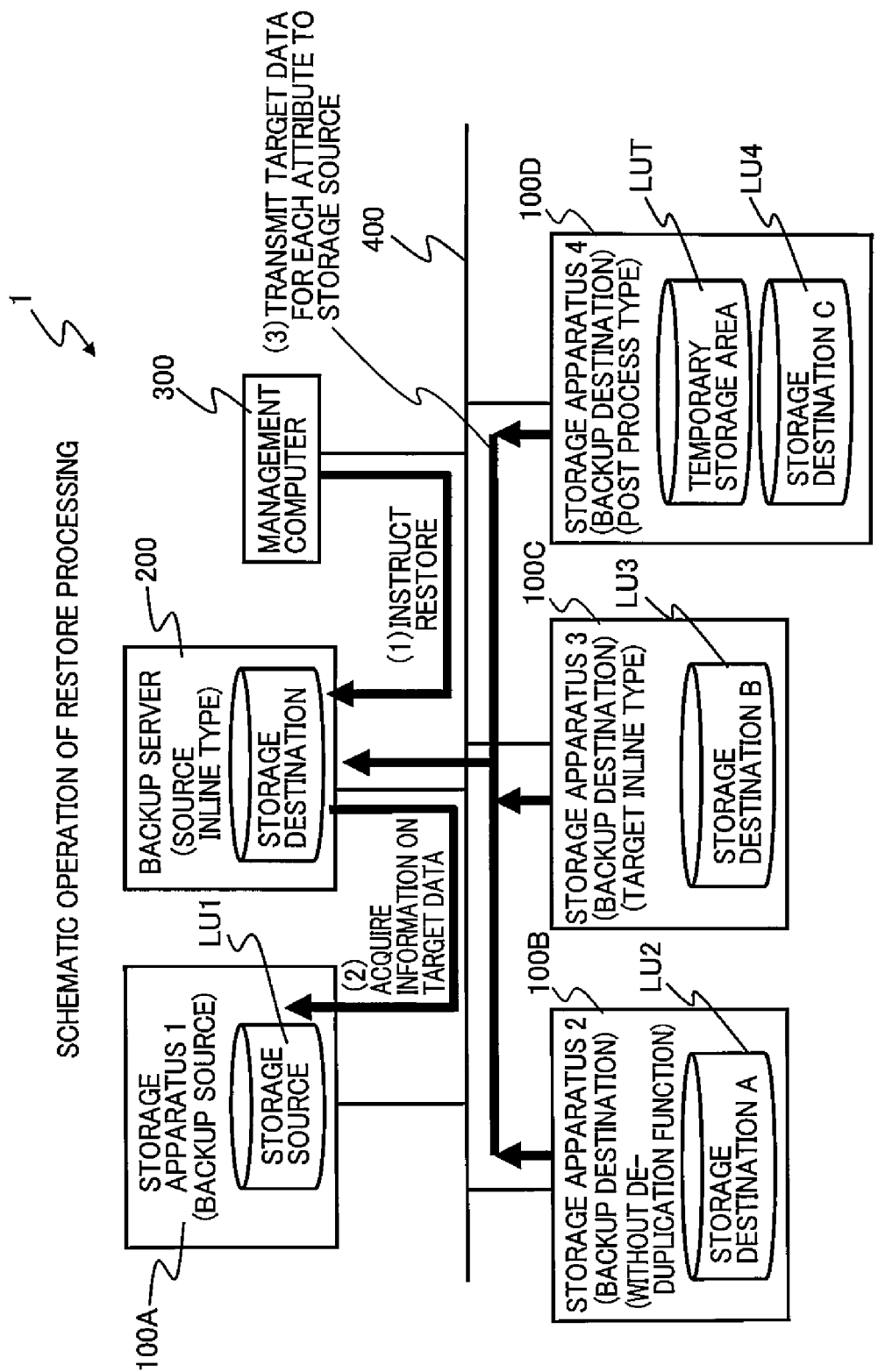
FIG. 25 is a diagram schematically showing a restore processing in the storage system 1.
Figure 26:
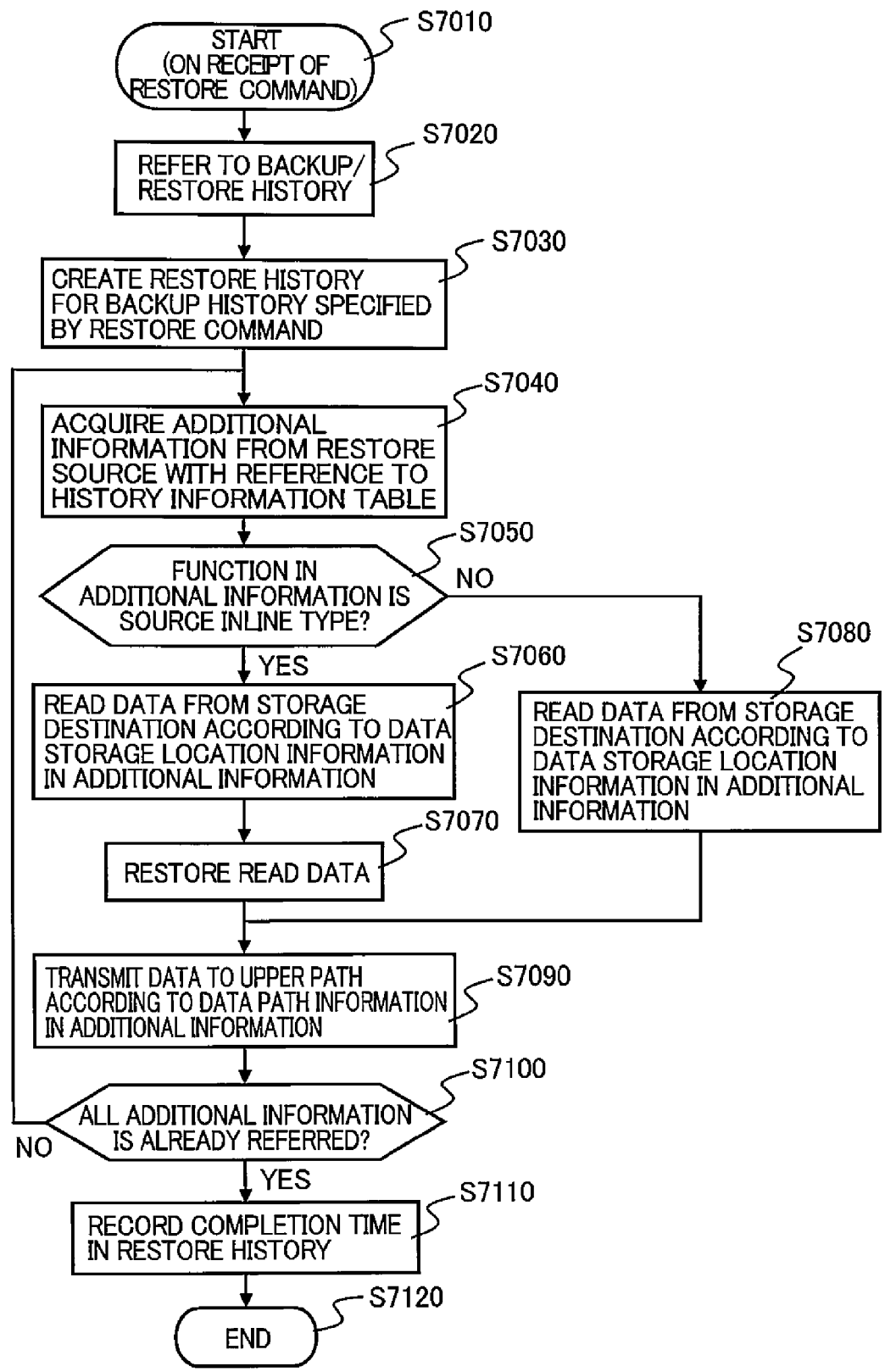
FIG. 26 is a diagram showing a process flow example of the restore processing.

Next, referring to FIG. 25 and FIG. 26, a restore processing in the storage system 1 is described. FIG. 25 is a diagram schematically showing the restore processing in the storage system 1, and FIG. 26 is a flowchart showing an example of a process flow in the restore processing.

Referring to FIG. 25, in the restore processing in the storage system 1, a restore processing part 2540 of the server 200 restores, based on a restore execution command sent from the management computer 300 to the server 200, restore target data (backed up data) allocated and stored in storage apparatuses 100B to 100D by de-duplication functions applied per data attribute and re-writes to the storage apparatus 100A which is a restore destination.

Referring to FIG. 26, the restore processing part 2540 of the server 200, which received a restore processing execution command from the management computer 300 or the like and started the processing (S7010), first refers to a backup history associated with the restore command in the backup/restore history information table 2650 (S7020), registers a new restore history record associated with the backup history, and records the start time 2653 (S7030). Next, the restore processing part 2540 refers to the backup/restore history information table 2650 and acquires, based on the backup destination (restore source) information 2656, the additional information 2660 sequentially from a storage apparatuses 100B, 100C, or 100D, which is a restore source (S7040).

Next, the restore processing part 2540 determines based on the de-duplication function ID 2661 recorded in the acquired additional information 2660 whether or not a de-duplication function applied to the data identified by the acquired additional information 2660 is the source inline type (S7050). If determined that the applied de-duplication function is the source inline type (S7050: Yes), the restore processing part 2540 reads data from the storage destination based on the data storage location information 2663 recorded in the additional information 2660 (S7060), and causes the de-duplication processing part 2400 of the server 200 to perform restore processing (S7070). If determined that the applied de-duplication function is not the source inline type (S7050: No), the restore processing part 2540 reads data from the storage destination based on the data storage location information 2663 recorded in the additional information 2660 (S7080), and proceeds the process to S7090.

At S7090, the restore processing part 2540 transmits target data to an upper path according to the data path information 2662 recorded in the additional information 2660.

Next, the restore processing part 2540 determines whether or not all additional information 2660 recorded in an applicable backup history of the backup/restore history information table 2650 has been referred to (S7100). If determined that all additional information 2660 has been referred to (S7100: Yes), the restore processing part 2540 updates the backup/restore history information table 2650 by recording the restore end time 2654 in the applicable restore history (S7110), and ends the process (S7120). If determined that all additional information 2660 has not been referred to (S7100: No), the restore processing part 2540 returns the process to S7040.

According to the restore processing of the present embodiment described above, each of backup data stored by the server 200 in different storage destinations per data attribute can be restored by applying an appropriate de-duplication processing and re-written into a backup source.

As described above in detail in line with one embodiment of the present invention, the present invention provides a storage system and a method for controlling the storage system, which is capable of automatically allocating data to a different de-duplication function in such a manner as to satisfy a limit time relative to the backup processing according to the type of backup target data.

Herein, the present invention is described with reference to the accompanying drawings in line with embodiments thereof, but the present invention is not limited thereto. Any modification and equivalency of the present invention shall be within the scope of the present invention as far as not departing from the spirit thereof.

The invention claimed is:

1. A storage system for providing a data storage area to an external apparatus, the storage system comprising at least:
   a first information apparatus including a first logical storage area constituting the data storage area, and a first data processing part for performing a processing for reducing a storage capacity of the first logical storage area used by backup target data; and
   a second information apparatus including a second logical storage area constituting the data storage area, and a second data processing part for performing a processing for reducing a storage capacity of the second logical storage area used by backup target data, the second information apparatus communicatively coupled with the first information apparatus, wherein the first information apparatus includes:
  backup speed data, restore speed data, cleaning speed data, and network speed data indicating a time required to process a unit data size of each data attribute indicating a type of the backup target data attribute of the backup target data by the first data processing part and the second data processing part for each data attribute,
  a backup target data allocation control part for calculating a total backup time, a total restore time, a total cleaning time, and a total network time from the backup speed data, the restore speed data, the cleaning speed data, and the network speed data and data size of each data attribute of the backup target data, the total backup time, the total restore time, the total cleaning time, and the total network time indicating a time required to process the backup target data of each data attribute by the first data processing part and the second data processing part, and obtaining a combination of the data attribute with the first data processing part or the second data processing part, the combination having the total backup time, the total restore time, the total cleaning time, and the total network time each equal to or shorter than a predetermined limit time, a maximum data removal amount thereby, and an upper limit value of a predetermined variation range set for the total backup time equal to or shorter than the backup limit time, and
  a backup processing part for backing up the backup target data in accordance with the combination of the data attribute with the first data processing part or the second data processing part that is to process the backup target data belonging to the data attribute, the combination determined by the backup target data allocation control part.

2. A method for controlling a storage system for providing a data storage area to an external apparatus, the storage system at least including:
  a first information apparatus including a first logical storage area constituting the data storage area, and a first data processing part for performing a processing for reducing a storage capacity of the first logical storage area used by backup target data; and
  a second information apparatus including a second logical storage area constituting the data storage area, and a second data processing part for performing a processing for reducing a storage capacity of the second logical storage area used by backup target data, the second information apparatus communicatively coupled with the first information apparatus, the method comprising the steps, executed by the first information apparatus, of:
  holding backup speed data, restore speed data, cleaning speed data, and network speed data indicating a time required to process a unit data size of each data attribute indicating a type of the backup target data attribute of the backup target data by the first data processing part and the second data processing part for each data attribute,
  calculating a total backup time, a total restore time, a total cleaning time, and a total network time from the backup speed data, the restore speed data, the cleaning speed data, and the network speed data and data size of each data attribute of the backup target data, the total backup time, the total restore time, the total cleaning time, and the total network time indicating a time required to process the backup target data of each data attribute by the first data processing part and the second data processing part, and obtaining a combination of the data attribute with the first data processing part or the second data processing part, the combination having the total backup time, the total restore time, the total cleaning time, and the total network time each equal to or shorter than a predetermined limit time, a maximum data removal amount thereby, and an upper limit value of a predetermined variation range set for the total backup time equal to or shorter than the backup limit time; and
  backing up the backup target data in accordance with the determined combination of the data attribute with the first data processing part or the second data processing part that is to process the backup target data belonging to the data attribute.

3. A storage system for providing a data storage area to an external apparatus, the storage system comprising at least:
  a first information apparatus including a first logical storage area constituting the data storage area, and a first data processing part for performing a processing for reducing a storage capacity of the first logical storage area used by backup target data; and
  a second information apparatus including a second logical storage area constituting the data storage area, and a second data processing part for performing a processing for reducing a storage capacity of the second logical storage area used by backup target data, the second information apparatus communicatively coupled with the first information apparatus, wherein
  the first information apparatus includes:
    backup speed data, restore speed data, cleaning speed data, and network speed data indicating a time required to process a unit data size of each data attribute indicating a type of the backup target data attribute of the backup target data by the first data processing part and the second data processing part for each data attribute,
    a backup target data allocation control part for calculating a total backup time, a total restore time, a total cleaning time, and a total network time from the backup speed data, the restore speed data, the cleaning speed data, and the network speed data and data size of each data attribute of the backup target data, the total backup time, the total restore time, the total cleaning time, and the total network time indicating a time required to process the backup target data of each data attribute by the first data processing part and the second data processing part, and obtaining a combination of the data attribute with the first data processing part or the second data processing part, the combination having the total backup time, the total restore time, the total cleaning time, and the total network time each equal to or shorter than a predetermined limit time, a maximum data removal amount thereby, and an upper limit value of a predetermined variation range set for the total backup time equal to or shorter than the backup limit time, and
    a backup processing part for backing up the backup target data in accordance with the combination of the data attribute with the first data processing part or the second data processing part that is to process the backup target data belonging to the data attribute, the combination determined by the backup target data allocation control part, wherein
    the backup target data allocation control part obtains a distribution of the total backup times in which the upper limit value of the variation range of the total backup times is most approximate to the backup limit time, and obtains a combination of the data attribute with the first data processing part or the second data processing part that is to process the backup target data belonging to the data attribute, the combination used to obtain the distribution of the total backup times, wherein the first data processing part processes the backup target data during the backup processing by performing at least any of data compression processing for reducing the data size of the backup target data, and de-duplication processing for preventing duplicate storage of data in the first logical storage area or the second logical storage area as a backup destination, and the second data processing part processes the backup target data, which is transferred without being processed by the first data processing part, by performing at least any of data compression processing for reducing the data size of the backup target data, and de-duplication processing for preventing duplicate storage of data in the first logical storage area or the second logical storage area as a backup destination, wherein the second information apparatus includes a temporary storage area configured to temporarily store the backup target data transferred without being processed by the first data processing part, and the second data processing part processes the backup target data, which is stored in the temporary storage area, at any timing by performing at least any of data compression processing for reducing the data size of the backup target data, and de-duplication processing for preventing duplicate storage of data in the first logical storage area or the second logical storage area as a backup destination, wherein the first data processing part creates additional information for a backup target file, the additional information including information identifying the first data processing part or the second data processing part which has processed the backup target data, and information indicating a storage destination of the backup target data having been processed by the first data processing part or the second data processing part, and stores the additional information into a predetermined storage destination in the storage system, and wherein the first information apparatus includes a restore processing part configured to restore backed-up backup target data to the first logical storage area or the second logical storage area of the backup source, the backup processing part records backup history information when executing the backup processing, the backup history information containing information identifying the first logical storage area or the second logical storage area of the backup source, information identifying the first logical storage area or the second logical storage area of the backup destination, and location of additional information created in the backup processing, which are recorded in association with each other, and the restore processing part refers to the backup history information containing a record of the information of the backup destination that is a restore source storing restore target data, and causes the first data processing part or the second data processing part, which is designated by the additional information recorded in the backup history, to execute the restore processing of the backup target data.

4. The storage system according to claim 1, wherein the backup target data allocation control part obtains a distribution of the total backup times in which the upper limit value of the variation range of the total backup times is most approximate to the backup limit time, and obtains a combination of the data attribute with the first data processing part or the second data processing part that is to process the backup target data belonging to the data attribute, the combination used to obtain the distribution of the total backup times.

5. The storage system according to claim 1, wherein the first data processing part processes the backup target data during the backup processing by performing at least any of data compression processing for reducing the data size of the backup target data, and de-duplication processing for preventing duplicate storage of data in the first logical storage area or the second logical storage area as a backup destination, and the second data processing part processes the backup target data, which is transferred without being processed by the first data processing part, by performing at least any of data compression processing for reducing the data size of the backup target data, and de-duplication processing for preventing duplicate storage of data in the first logical storage area or the second logical storage area as a backup destination.

6. The storage system according to claim 1, wherein the first data processing part creates additional information for a backup target file, the additional information including information identifying the first data processing part or the second data processing part which has processed the backup target data, and information indicating a storage destination of the backup target data having been processed by the first data processing part or the second data processing part, and stores the additional information into a predetermined storage destination in the storage system.

7. The storage system according to claim 1, wherein the first information apparatus includes a restore processing part configured to restore backed-up backup target data to the first logical storage area or the second logical storage area of the backup source, the backup processing part records backup history information when executing the backup processing, the backup history information containing information identifying the first logical storage area or the second logical storage area of the backup source, information identifying the first logical storage area or the second logical storage area of the backup destination, and location of additional information created in the backup processing, which are recorded in association with each other, and the restore processing part refers to the backup history information containing a record of the information of the backup destination that is a restore source storing restore target data, and causes the first data processing part or the second data processing part, which is designated by the additional information recorded in the backup history, to execute the restore processing of the backup target data.

8. The method for controlling a storage system according to claim 2, wherein the first data processing part obtains a distribution of the total backup times in which the upper limit value of the variation range of the total backup times is most approximate to the backup limit time, and obtains a combination of the data attribute with the first data processing part or the second data processing part that is to process the backup target data belonging to the data attribute, the combination used to obtain the distribution of the total backup times.

9. The method for controlling a storage system according to claim 2, wherein
the first data processing part processes the backup target data during the backup processing by performing at least any of data compression processing for reducing the data size of the backup target data, and de-duplication processing for preventing duplicate storage of data in the first logical storage area or the second logical storage area as a backup destination, and
the second data processing part processes the backup target data, which is transferred without being processed by the first data processing part, by performing at least any of data compression processing for reducing the data size of the backup target data, and de-duplication processing for preventing duplicate storage of data in the first logical storage area or the second logical storage area as a backup destination.

10. The method for controlling a storage system according to claim 2, wherein
the first data processing part creates additional information for a backup target file, the additional information including information identifying the first data processing part or the second data processing part which has processed the backup target data, and information indicating a storage destination of the backup target data having been processed by the first data processing part or the second data processing part, and stores the additional information into a predetermined storage destination in the storage system.

11. The method for controlling a storage system according to claim 2, wherein
the first information apparatus restores backed-up backup target data to the first logical storage area or the second logical storage area of the backup source,
the first data processing part records backup history information when executing the backup processing, the backup history information containing information identifying the first logical storage area or the second logical storage area of the backup source, information identifying the first logical storage area or the second logical storage area of the backup destination, and location of additional information created in the backup processing, which are recorded in association with each other, and
in reference to the backup history information containing a record of the information of the backup destination that is a restore source storing restore target data, the first data processing part or the second data processing part, which is designated by the additional information recorded in the backup history, to execute the restore processing of the backup target data.

12. The storage system according to claim 5, wherein
the second information apparatus includes a temporary storage area configured to temporarily store the backup target data transferred without being processed by the first data processing part, and
the second data processing part processes the backup target data, which is stored in the temporary storage area, at any timing by performing at least any of data compression processing for reducing the data size of the backup target data, and de-duplication processing for preventing duplicate storage of data in the first logical storage area or the second logical storage area as a backup destination.

13. The method for controlling a storage system according to claim 9, wherein
the second information apparatus includes a temporary storage area configured to temporarily store the backup target data transferred without being processed by the first data processing part, and
the second data processing part processes the backup target data, which is stored in the temporary storage area, at any timing by performing at least any of data compression processing for reducing the data size of the backup target data, and de-duplication processing for preventing duplicate storage of data in the first logical storage area or the second logical storage area as a backup destination.

* * * * *